(12) United States Patent
Riviere et al.

(10) Patent No.: US 8,822,009 B2
(45) Date of Patent: *Sep. 2, 2014

(54) INDUSTRIAL FABRIC, AND METHOD OF MAKING THEREOF

(75) Inventors: Pierre Riviere, Bas-rhin (FR);
Jean-Louis Monnerie, Saint-Junien (FR); Jonas Karlsson, Falkenberg (SE);
Dana Eagles, Appleton, WI (US); Sabri Mourad, Chatenois (FR); Robert A. Hansen, North Muskegon, MI (US)

(73) Assignee: Albany International Corp., Albany, NY (US)

( * ) Notice: Subject to any disclaimer, the term of this patent is extended or adjusted under 35 U.S.C. 154(b) by 232 days.

This patent is subject to a terminal disclaimer.

(21) Appl. No.: 13/063,688

(22) PCT Filed: Sep. 4, 2009

(86) PCT No.: PCT/US2009/056007
§ 371 (c)(1),
(2), (4) Date: Jul. 22, 2011

(87) PCT Pub. No.: WO2010/030570
PCT Pub. Date: Mar. 18, 2010

(65) Prior Publication Data
US 2012/0021171 A1   Jan. 26, 2012

Related U.S. Application Data

(60) Provisional application No. 61/096,149, filed on Sep. 11, 2008, provisional application No. 61/121,998, filed on Dec. 12, 2008, provisional application No. 61/147,637, filed on Jan. 27, 2009, provisional application No. 61/147,894, filed on Jan. 28, 2009.

(51) Int. Cl.
*B32B 3/24* (2006.01)
*B65H 37/00* (2006.01)
*D04H 1/44* (2006.01)
*B65H 20/00* (2006.01)
*B32B 5/10* (2006.01)
*D04H 1/46* (2012.01)
*D04H 5/02* (2012.01)

(52) U.S. Cl.
CPC .............. *D04H 1/44* (2013.01); *B65H 37/00* (2013.01); *B65H 2301/5142* (2013.01); *B65H 2406/332* (2013.01); *B65H 20/00* (2013.01); *B65H 2701/177* (2013.01); *B32B 5/10* (2013.01); *D04H 1/46* (2013.01); *B65H 2406/3223* (2013.01); *D04H 5/02* (2013.01)
USPC ............................ 428/131; 428/137; 428/134

(58) Field of Classification Search
USPC ........................... 428/137, 131, 134
See application file for complete search history.

(56) References Cited

U.S. PATENT DOCUMENTS

| | | |
|---|---|---|
| 2,862,251 A | 12/1958 | Kalwaites |
| 3,121,660 A | 2/1964 | Hall, Jr. |
| 3,214,819 A | 11/1965 | Guerin |
| 3,323,226 A | 6/1967 | Beaumont et al. |
| 3,399,111 A | 8/1968 | Beaumont et al. |
| 3,485,706 A | 12/1969 | Evans |
| 3,508,308 A | 4/1970 | Bunting, Jr. et al. |
| 4,085,485 A | 4/1978 | Brandon et al. |
| 4,206,258 A | 6/1980 | Balcar |
| 4,446,187 A | 5/1984 | Eklund |
| 4,537,658 A | 8/1985 | Albert |
| 4,541,895 A | 9/1985 | Albert |
| 4,849,054 A | 7/1989 | Klowak |
| 5,098,764 A | 3/1992 | Drelich et al. |
| 5,208,087 A | 5/1993 | Stigberg |
| 5,244,711 A | 9/1993 | Drelich et al. |
| 5,245,025 A | 9/1993 | Trokhan et al. |
| 5,281,461 A | 1/1994 | Greenway et al. |
| 5,298,124 A | 3/1994 | Eklund et al. |
| 5,336,373 A | 8/1994 | Scattolino et al. |
| 5,393,384 A | 2/1995 | Steiner et al. |
| 5,445,746 A | 8/1995 | Lee |
| 5,549,193 A | 8/1996 | Schlueter, Jr. et al. |
| 5,674,587 A * | 10/1997 | James et al. .................. 428/131 |
| 5,679,222 A | 10/1997 | Rasch et al. |
| 5,713,399 A | 2/1998 | Collette et al. |
| 5,718,022 A | 2/1998 | Vuillaume |
| 5,730,817 A | 3/1998 | Feygin et al. |

| | | | |
|---|---|---|---|
| 5,768,756 A | 6/1998 | Noelle | |
| 5,814,349 A | 9/1998 | Geus et al. | |
| 5,827,597 A | 10/1998 | James et al. | |
| 5,837,102 A | 11/1998 | Graf | |
| 5,900,122 A | 5/1999 | Huston | |
| 5,906,786 A | 5/1999 | James et al. | |
| 5,916,462 A | 6/1999 | James et al. | |
| 5,972,813 A | 10/1999 | Polat et al. | |
| 6,010,598 A | 1/2000 | Boutilier et al. | |
| 6,120,642 A | 9/2000 | Lindsay et al. | |
| 6,124,015 A | 9/2000 | Baker et al. | |
| 6,159,880 A | 12/2000 | Schiel | |
| 6,171,447 B1 | 1/2001 | Trokhan | |
| 6,274,042 B1 | 8/2001 | Beck | |
| 6,290,818 B1 | 9/2001 | Romanski | |
| 6,331,341 B1 | 12/2001 | Joyce | |
| 6,340,413 B1 | 1/2002 | Nilsson et al. | |
| 6,358,594 B1 | 3/2002 | Ampulski | |
| 6,436,240 B1 | 8/2002 | Jeffrey | |
| 6,461,474 B1 | 10/2002 | Lindsay et al. | |
| 6,547,924 B2 | 4/2003 | Klerelid et al. | |
| 6,610,173 B1 | 8/2003 | Lindsay et al. | |
| 6,616,812 B2 | 9/2003 | Beck | |
| 6,616,814 B2 | 9/2003 | Best | |
| 6,630,223 B2 | 10/2003 | Hansen | |
| 6,660,362 B1 | 12/2003 | Lindsay et al. | |
| 6,712,940 B2 | 3/2004 | Crook | |
| 6,723,208 B1 | 4/2004 | Hansen | |
| 6,743,339 B1 | 6/2004 | Nilsson et al. | |
| 6,743,571 B1 | 6/2004 | Hill et al. | |
| 6,780,282 B2 | 8/2004 | Scherb et al. | |
| 6,865,784 B2 | 3/2005 | Nolle | |
| 6,875,315 B2 | 4/2005 | Bakken et al. | |
| 6,878,238 B2 | 4/2005 | Bakken et al. | |
| 6,998,017 B2 | 2/2006 | Lindsay et al. | |
| 7,005,044 B2 | 2/2006 | Kramer et al. | |
| 7,008,513 B2 | 3/2006 | Davenport et al. | |
| 7,014,735 B2 | 3/2006 | Kramer et al. | |
| 7,022,208 B2 | 4/2006 | Davenport et al. | |
| 7,128,809 B2 | 10/2006 | Viinson et al. | |
| 7,128,810 B2 | 10/2006 | Hansen | |
| 7,141,142 B2 | 11/2006 | Burazin et al. | |
| 7,144,479 B2 | 12/2006 | Davis et al. | |
| 7,166,196 B1 | 1/2007 | Kramer et al. | |
| 7,169,265 B1 | 1/2007 | Kramer et al. | |
| 7,294,237 B2 | 11/2007 | Herman et al. | |
| 7,294,238 B2 | 11/2007 | Bakken et al. | |
| 7,297,233 B2 | 11/2007 | Herman et al. | |
| 7,410,554 B2 | 8/2008 | Davenport | |
| 7,491,297 B2 | 2/2009 | Serr et al. | |
| 7,494,571 B2 | 2/2009 | Takamura | |
| 7,501,044 B2 | 3/2009 | Hikida et al. | |
| 7,504,060 B2 | 3/2009 | Brock et al. | |
| 7,524,403 B2 | 4/2009 | Fernandes et al. | |
| 7,527,709 B2 | 5/2009 | Lippi Alves Fernandes et al. | |
| 7,540,942 B2 | 6/2009 | Hikita | |
| 7,550,061 B2 | 6/2009 | Walkenhaus et al. | |
| 8,454,800 B2 * | 6/2013 | Mourad et al. | 162/348 |
| 2003/0087575 A1 | 5/2003 | Carlson et al. | |
| 2003/0145444 A1 | 8/2003 | Schmitz | |
| 2004/0069432 A1 | 4/2004 | Hansen | |
| 2004/0116031 A1 | 6/2004 | Brennan et al. | |
| 2004/0118545 A1 | 6/2004 | Bakken et al. | |
| 2004/0118546 A1 | 6/2004 | Bakken et al. | |
| 2005/0167062 A1 | 8/2005 | Herman et al. | |
| 2007/0134467 A1 | 6/2007 | Sayers | |
| 2007/0167099 A1 | 7/2007 | Patel et al. | |
| 2007/0246119 A1 | 10/2007 | Herman | |
| 2010/0239814 A1 * | 9/2010 | Mourad et al. | 428/131 |

FOREIGN PATENT DOCUMENTS

| | | |
|---|---|---|
| DE | 25 38 691 A | 3/1977 |
| DE | 3444082 A | 8/1986 |
| DE | 19548747 A | 7/1997 |
| EP | 0 037 387 A | 10/1981 |
| EP | 0 103 376 A | 7/1983 |
| EP | 0 147 904 A | 7/1985 |
| EP | 0 337 451 A | 10/1989 |
| EP | 0 446 432 A | 9/1991 |
| EP | 0 705 933 A | 4/1996 |
| EP | 0 972 876 A2 | 1/2000 |
| EP | 1 040 223 B | 2/2003 |
| EP | 0 868 251 B | 11/2004 |
| EP | 1 566 259 A | 8/2005 |
| EP | 1 339 915 B | 7/2007 |
| FR | 1 460 513 A | 10/1966 |
| FR | 2730246 A | 8/1996 |
| FR | 2734285 A | 11/1996 |
| GB | 995620 | 6/1965 |
| GB | 1025000 | 4/1966 |
| GB | 1037003 | 7/1966 |
| GB | 1 393 426 | 5/1975 |
| GB | 1515455 | 6/1978 |
| JP | 61-020686 | 1/1986 |
| JP | 06-170959 | 6/1994 |
| JP | 2001-288671 A | 10/2001 |
| WO | WO 86/05219 A | 9/1986 |
| WO | WO 95/21285 A | 8/1995 |
| WO | WO 98/00605 A | 1/1998 |
| WO | WO 98/01618 A | 1/1998 |
| WO | WO 99/10597 A | 3/1999 |
| WO | WO 02/40769 A | 5/2002 |
| WO | WO 02/41815 A | 5/2002 |
| WO | WO 2004/038093 A | 5/2004 |
| WO | WO 2005/042836 A | 5/2005 |
| WO | WO 2005/087997 A | 9/2005 |
| WO | WO 2005/116332 A | 12/2005 |
| WO | WO 2008/006870 A | 1/2008 |
| WO | WO 2010/030298 A | 3/2010 |
| WO | WO-2010/030570 A | 3/2010 |

OTHER PUBLICATIONS

International Search Report and Written Opinion for PCT/US2010/022247.
International Search Report and Written Opinion from EPO for PCT/US2008/076647.
International Search Report and Written Opinion from EPO for PCT/US2009/056007.
International Search Report and Written Opinion from EPO for PCT/US2009/055751.
International Search Report and Written Opinion prepared by European Patent Office acting as the International Searching Authority for related international application PCT/US2013/040364 mailed Jul. 25, 2013.

* cited by examiner

*Primary Examiner* — William P Watkins, III

(74) *Attorney, Agent, or Firm* — Frommer Lawrence & Haug LLP; Ronald R. Santucci

(57) ABSTRACT

A support member such as a belt or sleeve includes a topographical pattern on its sheet contact side. A plurality of land areas, corresponding depressions, through voids, and/or groove areas are formed on the top surface of the support member to produce the topographical pattern. The land areas, corresponding depressions, through voids, and/or groove areas may be formed by graving, cutting, etching, embossing, mechanical perforation or a combination thereof. The improved belt or sleeve imparts desired physical characteristics, such as bulk, appearance, texture, absorbency, strength, and hand to a nonwoven product produced thereon.

46 Claims, 17 Drawing Sheets

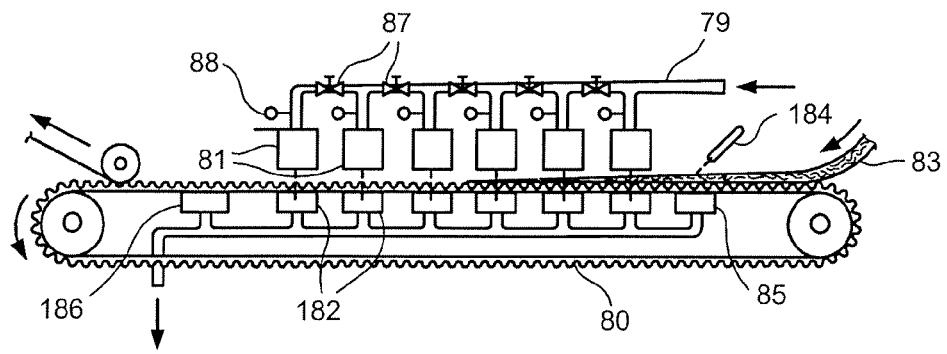
F I G. 1
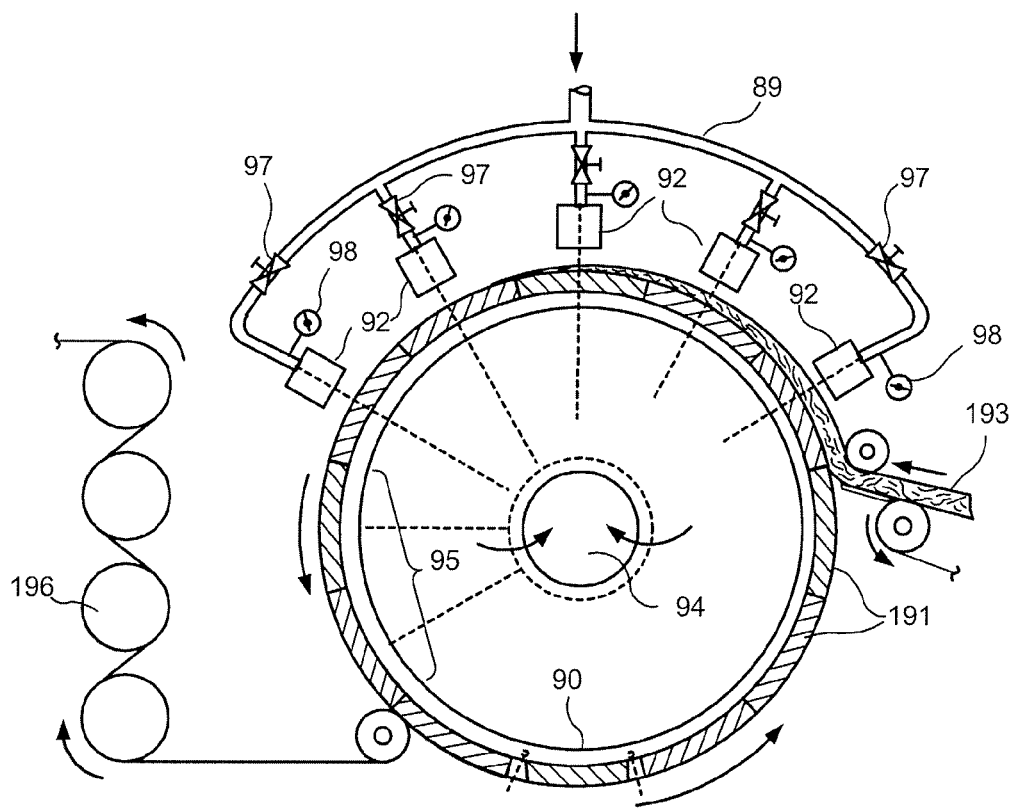
F I G. 2

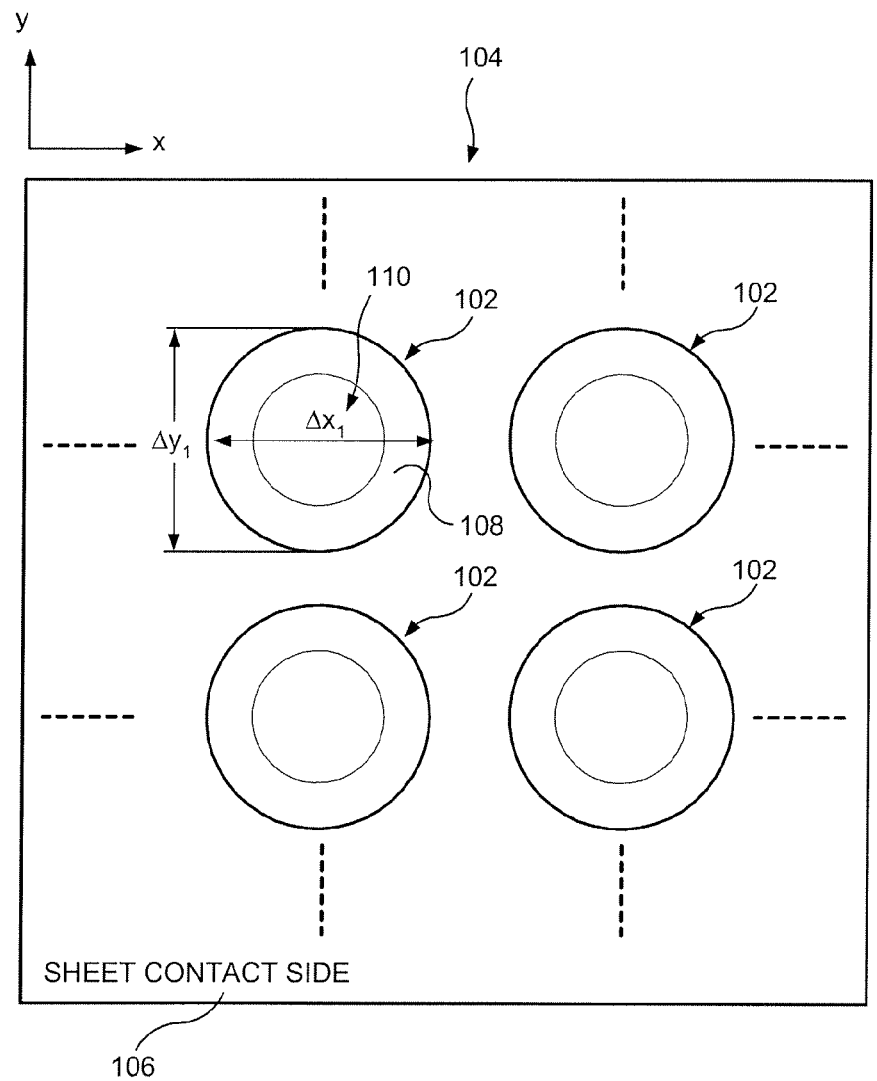
F I G. 3A

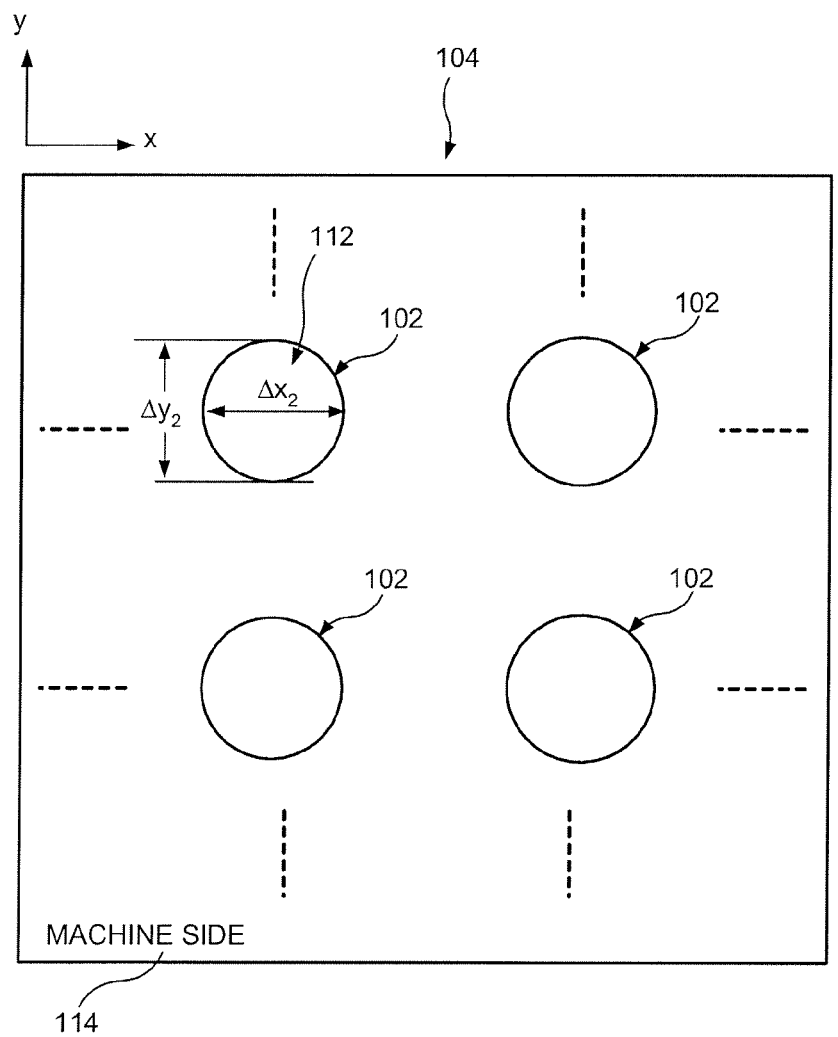
F I G. 3B

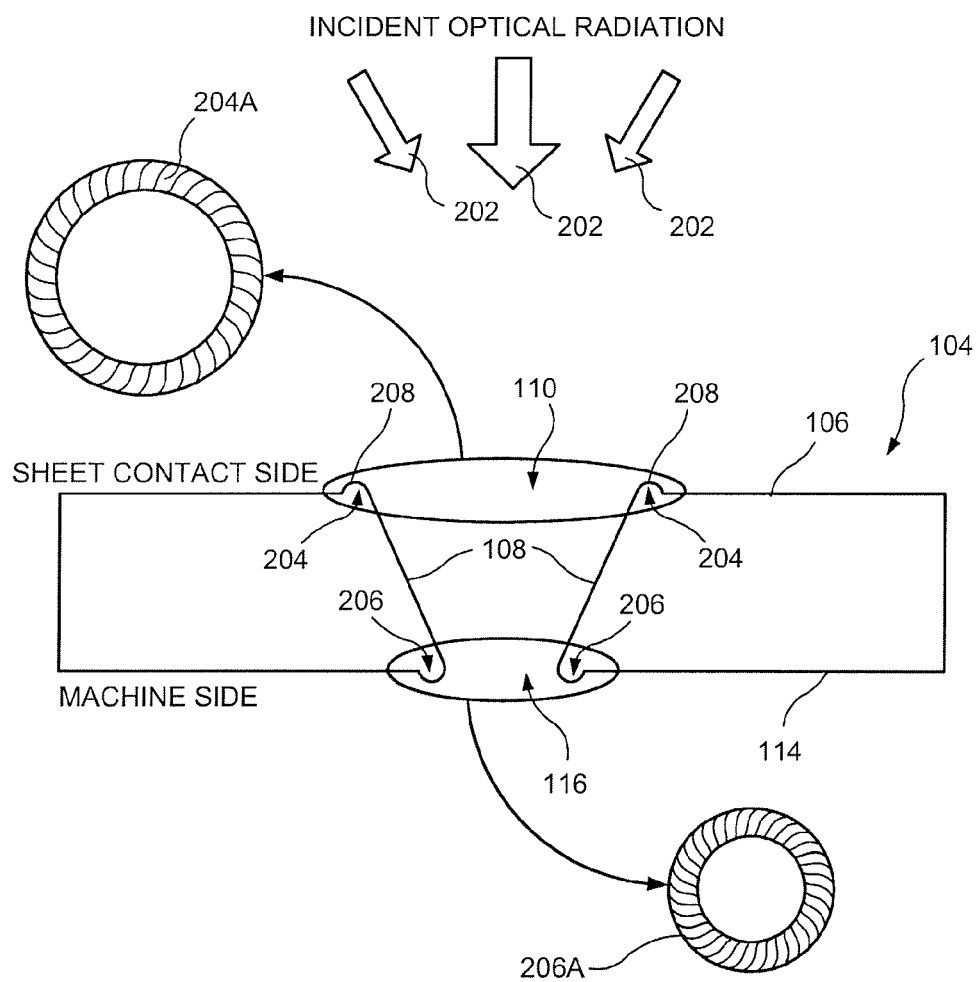
F I G. 4A

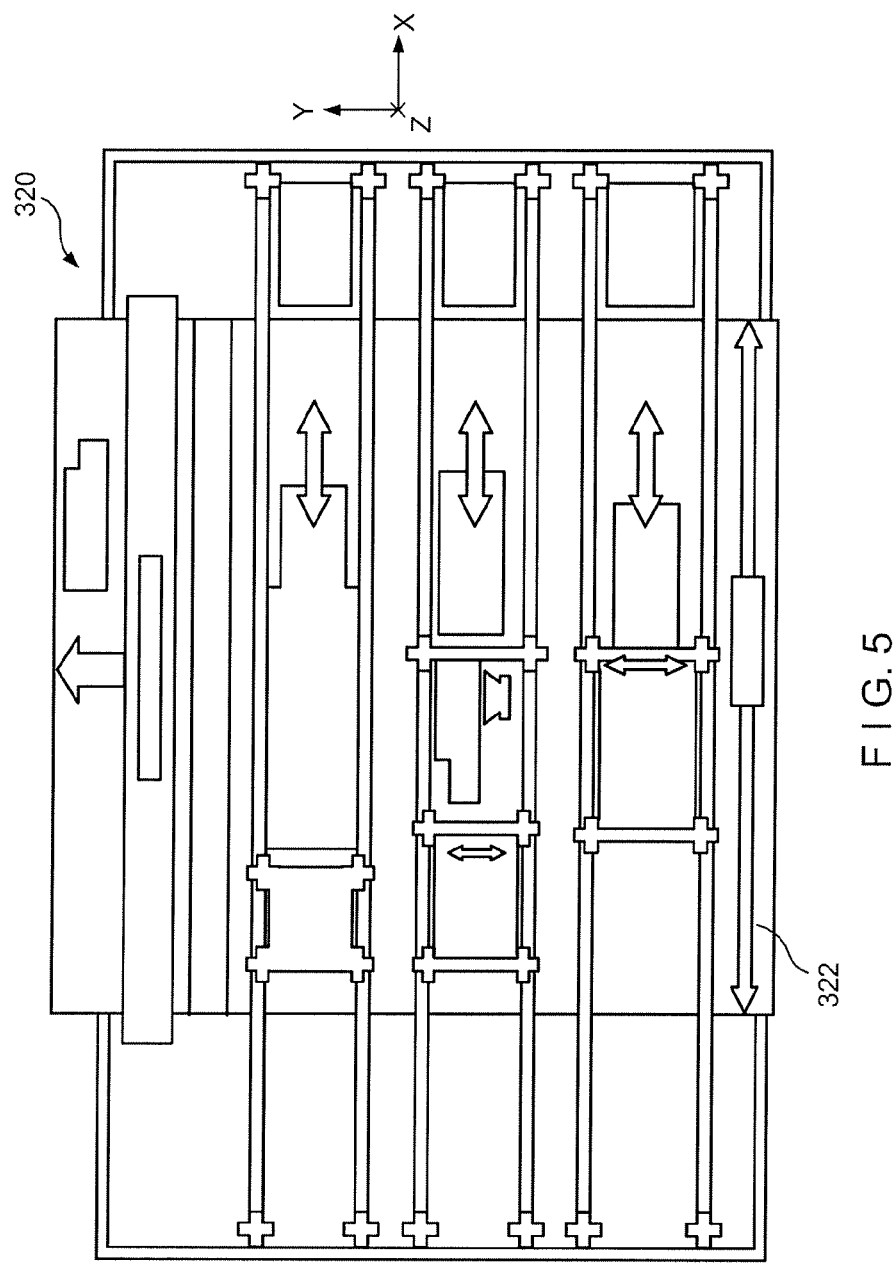

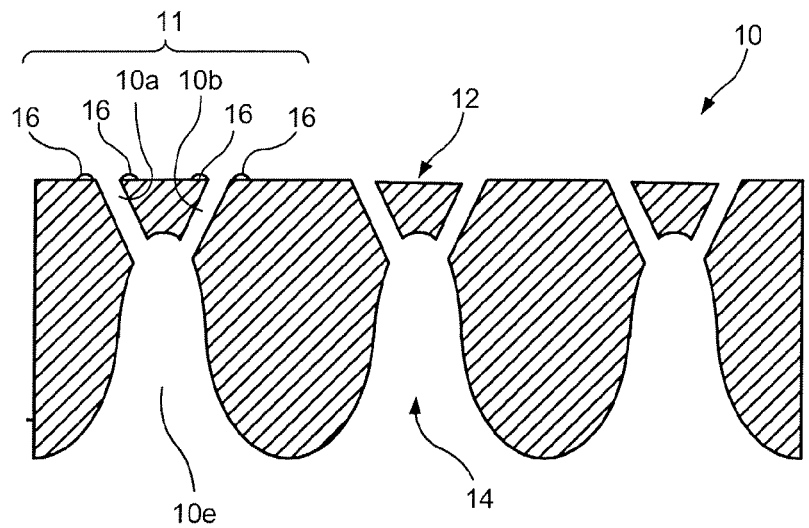
F I G. 10A
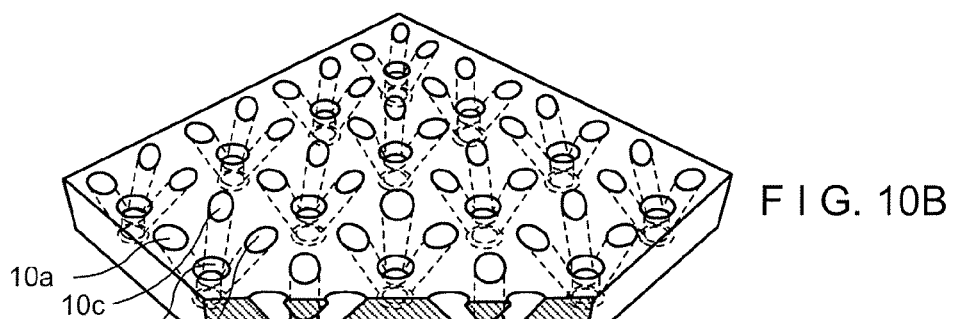
F I G. 10B
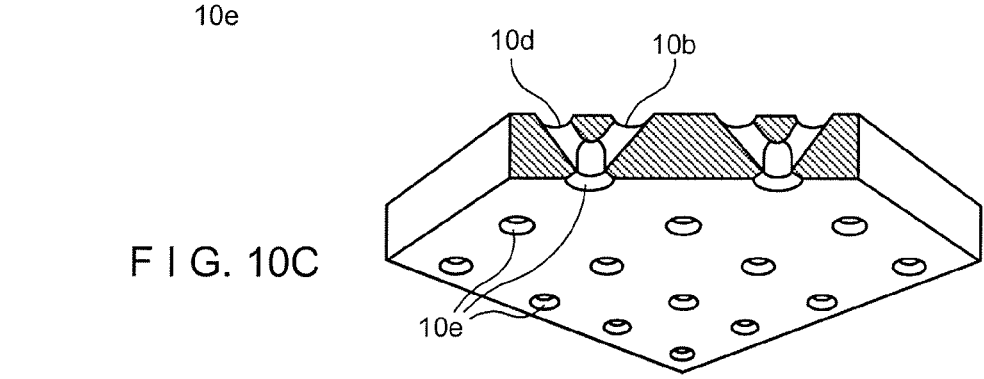
F I G. 10C

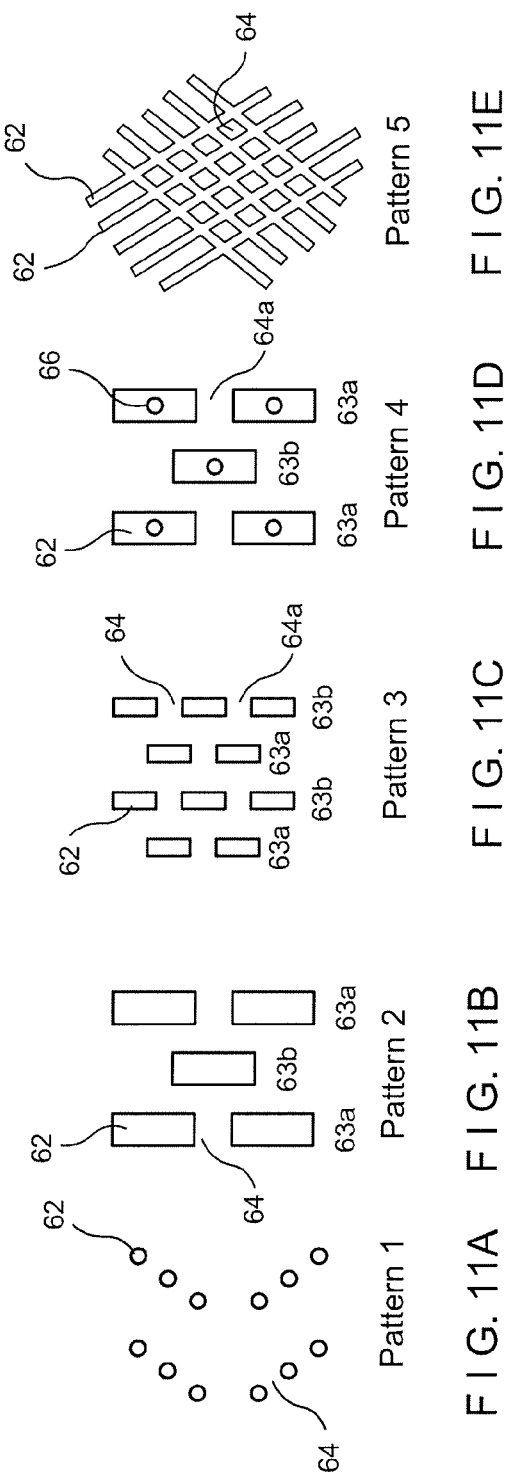

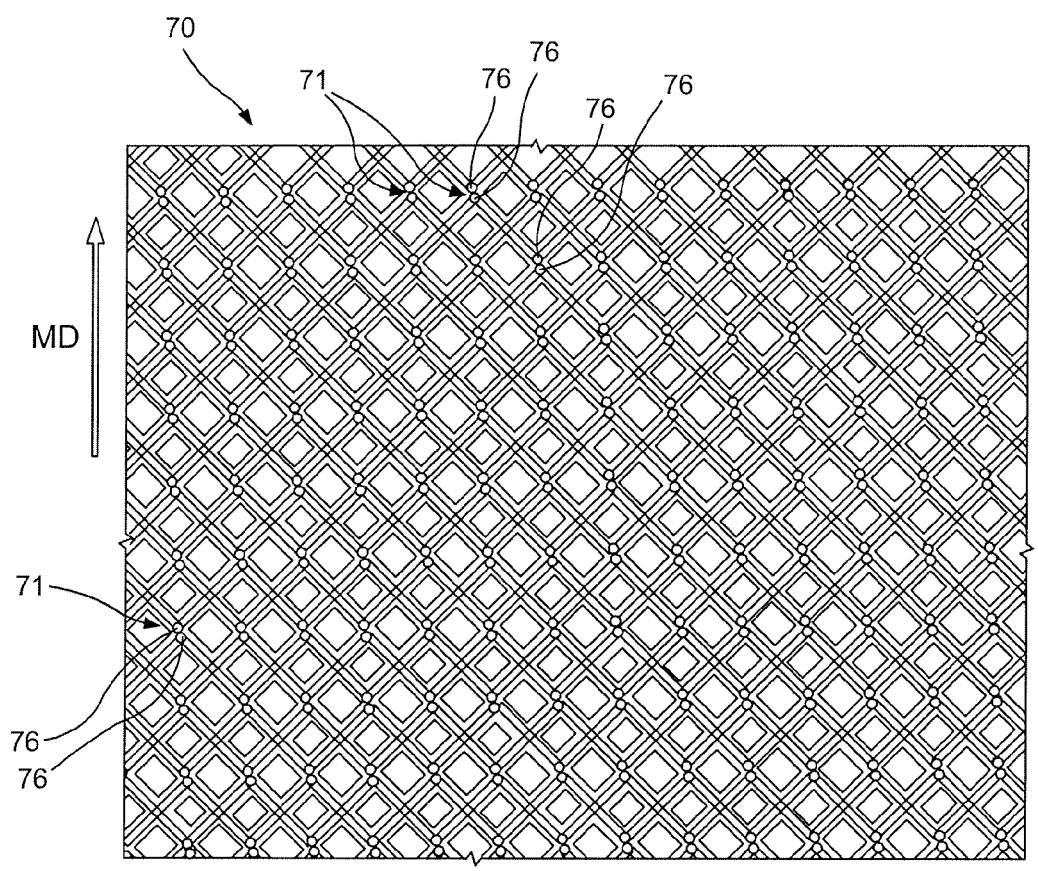
F I G. 12

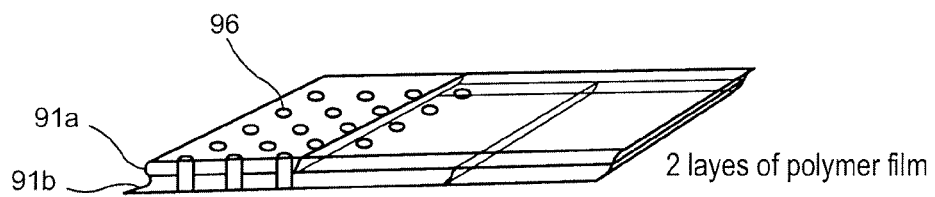
F I G. 14A
Sheet contact side | Machine side
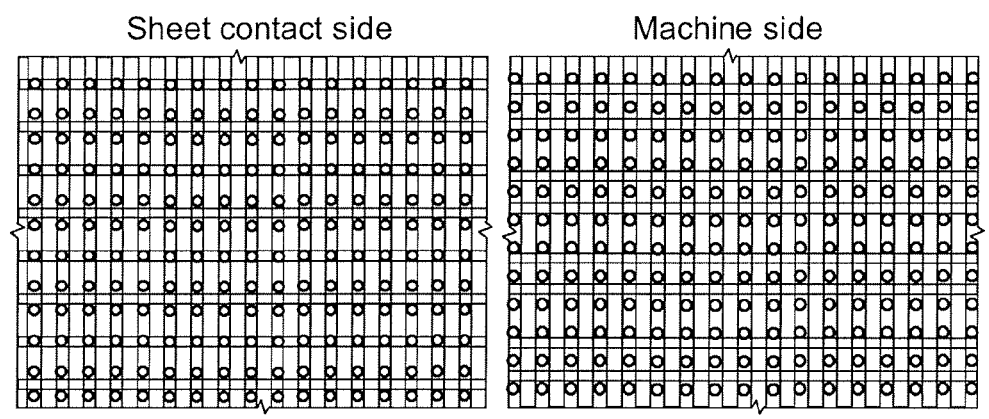
F I G. 14B  F I G. 14C
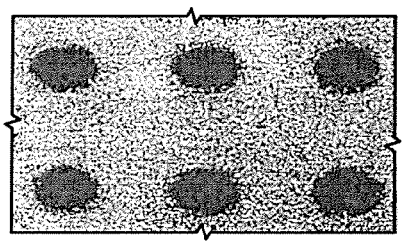 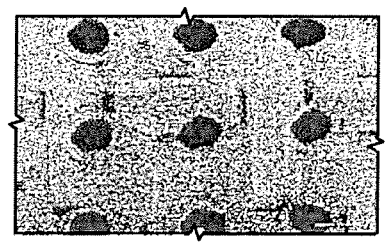
SEM picture of sheet contact side | SEM picture of machine side
F I G. 14D  F I G. 14E

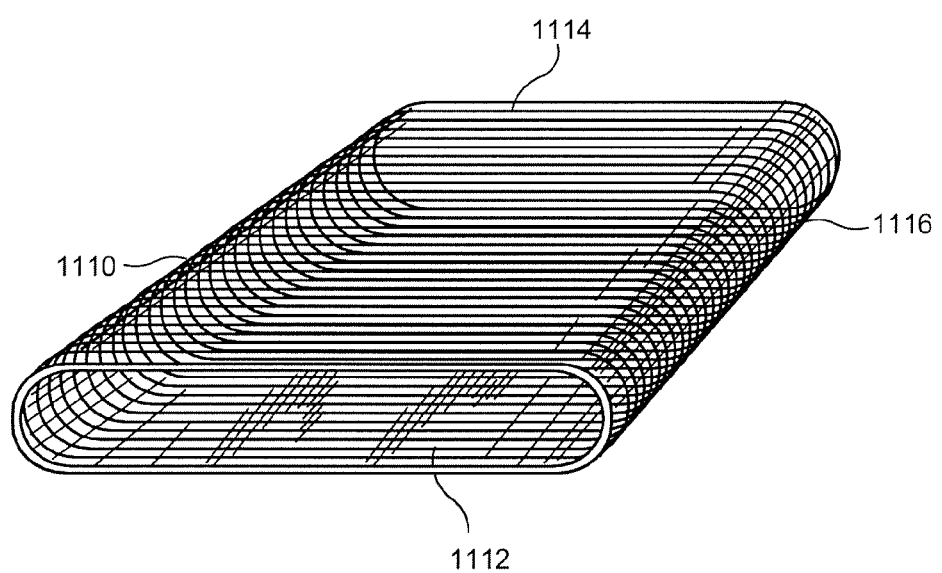
F I G. 15

INDUSTRIAL FABRIC, AND METHOD OF MAKING THEREOF

CROSS-REFERENCE TO RELATED APPLICATION

This application is a 371 of PCT/US2009/056007 filed on Sep. 4, 2009 published on Mar. 18, 2010 under publication number WO 2010/030570 A and claims priority benefits of U.S. Provisional Patent Application Ser. No. 61/096,149 filed Sep. 11, 2008, U.S. Provisional Patent Application Ser. No. 61/121,998 filed Dec. 12, 2008, U.S. Provisional Patent Application Ser. No. 61/147,637 filed Jan. 27, 2009, U.S. Provisional Patent Application Ser. No. 61/147,894 filed Jan. 28, 2009, the disclosures of which are incorporated herein by reference.

BACKGROUND OF THE INVENTION

1. Field of the Invention

The present invention is directed to endless structures, and particularly, industrial fabrics used in the production of nonwoven products. More particularly, the instant invention is directed to support members such as belts or sleeves used in the production of patterned, marked, or textured nonwoven products.

2. Description of the Prior Art

Processes for making nonwoven products have been known for many years. In one process, a fiber batt or web is treated with water streams or jets to cause the fibers to entangle with each other and improve the physical properties, such as strength, of the web. Such techniques for treatment by means of water jets have been known for decades, as may be gathered from the disclosures of U.S. Pat. Nos. 3,214,819, 3,508,308 and 3,485,706.

In general terms, this method involves interlacing of elementary fibers with one another by means of the action of water jets under pressure, which act on the fibrous structure like needles and make it possible to reorient part of the fibers forming the web in the thickness direction.

Such technology has been widely developed at the present time and is used not only for producing what are known as "spunlaced" or "hydroentangled" structures for textile use, such as, in particular for applications in medical fields and hospitals, for wiping, filtration and wrappings for teabags, but also for making tiny perforations in continuous media such as paper, cardboard, films, even sheets of plastic or the like and the articles obtained may be regular and homogeneous, as may be gathered from the disclosure of U.S. Pat. No. 3,508, 308, and if required, comprise designs resulting from the reorientation of the fibers, this being essential for an esthetic purpose, as may be gathered from the disclosure of U.S. Pat. No. 3,485,706.

As to products of the "spunlace" or "hydroentangled" type, it has been known for a very long time that the final properties of the product can be adapted by producing mixtures of material, for example by combining a plurality of webs consisting of fibers of different types, for example of natural, artificial or synthetic fibers, or even webs in which the fibers are previously mixed (webs of the "spunbond" type, etc.) with reinforcements that can be incorporated into the nonwoven structure.

French patents FR-A-2 730 246 and 2 734 285, corresponding respectively to U.S. Pat. No. 5,718,022 and U.S. Pat. No. 5,768,756, describe solutions which make it possible to successfully treat hydrophobic fibers or mixtures of these fibers with other hydrophilic fibers or even webs consisting entirely of natural fibers by means of water jets.

In general terms, according to the teachings of these documents, the treatment involves treating a basic web composed of elementary fibers of the same type or of different types, compressing and moistening this basic web and then intermingling the fibers by means of at least one rack of contiguous jets of water under high pressure acting on the basic web.

For this purpose, the basic web is advanced positively on an endless porous support in motion, and it is brought onto the surface of a perforated rotary cylindrical drum, to the interior of which a partial vacuum is applied. The basic web is compressed mechanically between the porous support and the rotary drum which both advance substantially at the same speed. Immediately downstream of the compression zone, a water curtain is directed onto the web and passes successively through the porous support, the compressed basic web and the supporting perforated drum which sucks up the excess water.

The elementary fibers are intermingled continuously, still on the rotary cylindrical drum, by the compressed and wetted web being subjected to the action of at least one rack of jets of water under high pressure. In general, bonding is carried out by means of a plurality of successive racks of water jets which act either on the same face or alternately against the two faces of the web, the pressure within the racks and the velocity of the jets discharged varying from one rack to the next and usually progressively.

It is important to note, as may be gathered from FR 2 734 285, that the perforated roller may comprise randomly distributed micro-perforations. If required, after the initial bonding treatment, the fibrous nonwoven structure may be subjected to a second treatment applied to the reverse face.

In the process of producing spunlaced or hydroentangled nonwoven products, it is desired to impart a pattern or mark on the finished product, thereby creating a desired design on the product. This pattern or mark is typically developed using a secondary process, separate from the nonwoven sheet forming and roll-up process, where a calendar roll is used. These rolls are typically expensive and operate on the principle of compressing certain areas of the fibrous web to create the required patterns or marks. However, there are several drawbacks of using a separate process for creating the pattern or mark on the nonwoven product. For starters, a high initial investment for calendar rolls would be required, which can limit the size of runs that can be economically justified by a producer. Second, higher processing costs would be incurred due to a separate patterning or marking stage. Third, the final product would have a higher than required material content to maintain product caliper after compression in the calendaring step. Lastly, the two-stage process would lead to a low bulk in the finished product due to high pressure compression during calendaring. Prior art nonwoven products made with these known patterning processes do not have clear, well defined raised portions and therefore the desired patterns are difficult to see. In addition, the raised portions of prior art embossed nonwoven products are not dimensionally stable and their raised portions lose their three-dimensional structure when stressed, as for example, when they are handled or laundered.

U.S. Pat. Nos. 5,098,764 and 5,244,711 disclose the use of a support member in a more recent method of producing nonwoven webs or products. The support members have a topographical feature configuration as well as an array of apertures. In this process, a starting web of fiber is positioned on the topographical support member. The support member with the fibrous web thereon is passed under jets of high pressure fluid, typically water. The jets of water cause the fiber to intertwine and entangle with each other in a particular pattern, based on the topographical configuration of the support member.

The pattern of topographical features and apertures in the support member is critical to the structure of the resulting nonwoven product. In addition, the support member must have sufficient structural integrity and strength to support a fibrous web while fluid jets rearrange the fibers and entangle them in their new arrangement to provide a stable fabric. The support member must not under go any substantial distortion under the force of the fluid jets. Also, the support member must have means for removing the relatively large volumes of entangling fluid so as to prevent "flooding" of the fibrous web, which would interfere with effective entangling. Typically, the support member includes drainage apertures which must be of a sufficiently small size to maintain the integrity of the fibrous web and prevent the loss of fiber through the forming surface. In addition, the support member should be substantially free of burrs, hooks or the like irregularities that could interfere with the removal therefrom of the entangled nonwoven product. At the same time, the support member must be such that fibers of the fibrous web being processed thereon are not washed away under the influence of the fluid jets.

One of the main problems which arises during the production of nonwoven products is that of achieving the cohesion of the structure in order to give the products mechanical characteristics according to the application in question, while maintaining or imparting particular physical characteristics, such as bulk, hand, appearance, etc.

The properties of bulk, absorbency, strength, softness, and aesthetic appearance are indeed important for many nonwoven products when used for their intended purpose. To produce a nonwoven product having these characteristics, a support fabric, belt, or sleeve will often be constructed such that the sheet contact surface exhibits topographical variations.

It should be appreciated that these fabrics may take the form of endless loops or can be made endless and function in the manner of conveyors, or as a sleeve mounted on a cylinder. It should further be appreciated that nonwoven production is a continuous process which proceeds at considerable speeds. That is to say, the elementary fibers or layers of fibers are continuously deposited onto the forming fabric in the forming section, while a newly manufactured nonwoven web is continuously wound onto rolls after it is dried.

SUMMARY OF THE INVENTION

The instant invention provides an improved fabric, belt, or sleeve that functions in place of a traditional fabric, belt, or sleeve, and aids in imparting desired physical characteristics, such as bulk, appearance, texture, absorbency, strength, and hand to the nonwoven products produced thereon.

Other advantages such as, but not limited to, more effective wet shaping; an improved web release over prior art woven fabrics as a result of no yarn crossovers like in woven fabrics to trap elementary fibers; and easier cleanability are provided.

It is therefore a principal object of the invention to provide a spunlacing or hydroentangling support member such as a fabric, belt, or sleeve that has a web contact surface pattern of a series of raised land areas and corresponding depressions that impart a texture to the nonwoven product produced thereon.

Another aspect of the disclosure is the structure has voids such as through holes to allow the passage of either or both of water or air.

In one embodiment, a fabric structure is disclosed that is used to make textured nonwoven products, the structure being permeable to air and water, comprising the sheet contact surface having a pattern including a series of raised land areas and corresponding depressions adapted to impart a texture to the nonwoven product produced thereon, and a series of through voids adapted to allow passage of both water and air from the fabric surface into the surface.

One embodiment relates to a support member such as a belt or sleeve for supporting and conveying polymeric fibers in a spunlace or hydroentanglement process. Many nonwoven products are calendared after being formed in a second process. During that process, one calendar roll (or both) may have a pattern on the surface that is used to impart a texture to the nonwoven. The instant inventive belts or sleeves exhibit the following non-limiting advantages over this separate calendaring process: sleeves are a relatively less expense item with no large capital investment in fixed equipment; patterning is accomplished during the forming process itself, eliminating the need for a separate additional process; lower material content in the final product can be achieved as product caliper is not reduced from compression due to calendaring; the finished product can be produced with high bulk as it is not compressed at any stage. To the nonwoven rolled-goods producer, these process advantages further lead to the end product advantages of: lower cost spunlace or hydroentangled webs with patterns or marks; the ability to customize products as the volume justification for patterns is greatly reduced; production of higher performance products as high bulk imparts the characteristic of higher absorbency, which is of great value in consumer applications.

The inventive belt or sleeve is an endless structure with permeability usually in the range of 100-500 cfm, and can comprise any number of layers, such as single, double, or triple layered. The polymeric materials of construction can consist of extrudable thermoplastics or room temperature, UV, or heat cross-linkable resins, in the polyester, acrylic or polyurethane families, for example. Materials are selected so as to ensure functionality in the spunlacing process where entangling shower pressures of up to 250 bars may be employed.

One embodiment relates to belts or sleeves for producing spunlace or hydroentangled nonwoven products. The belt or support member or sleeve is an air and/or water permeable support member which can be made from an extruded or laminated film in which defined holes are made in order to have the required air and/or water permeability. These holes can have different diameters ranging from 0.01 mm to 5 mm with different entry angles on the belt's or sleeve's surface. The shape of the holes can be round, square, oval or any specific shape such as a star shape. The holes on the surface of the support member can be randomly positioned or with specific density in some areas or uniformly on the surface depending on the required effect. Instead of holes, lines or grooves can be cut/etched into the support member or belt to create patterns, or even logos. The support member can be produced with one or more layers of a polymeric film, with or without reinforcement, which can be woven or a nonwoven. It can also be made as a laminate with a woven or nonwoven layer between two or more layers of a polymeric film. This reinforcement increases the mechanical characteristics and stability of the belt/sleeve.

The surface of the support member can be processed in order to create a topography by cutting or graving a pattern e.g. a honeycomb structure, and/or can be treated with a chemical coating for a specific application such as static dissipation, contamination/soil release, improving durability etc. The surface of the support member can be graved, for example, to create a topography for a patterning application. The support member can be made as a sleeve to be installed on a drum (sleeve) or as an endless or seamable (made endless) belt or support member. The use of this type of support member allows a better reflection of hydraulic energy when compared to a prior art standard woven belt. This improves entangling of fibers in the nonwoven and prevents fiber penetration into the support belt apertures/holes/voids, which can lead to fiber loss or difficulty in releasing the nonwoven cleanly and uniformly from the support belt/sleeve, as may be observed in woven belts or support members. The result is: better fiber entanglement and less fiber picking, resulting in better product release or transfer from this support member to another position or support member. The machine side can have an MD yarn array of monofilaments laminated or partially embedded into the support belt/sleeve in order to create higher drainage.

For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1 is a schematic view of an apparatus for producing a nonwoven product using the support members of the present invention;

FIG. 2 is a schematic view of an apparatus for producing a nonwoven product using the support members of the present invention;

FIGS. 3A and 3B are examples of a support member having through voids according to one aspect of the instant invention;

FIGS. 4A and 4B illustrate steps involved in a method for producing a support member, according to one embodiment of the present invention;

FIG. 5 illustrates an apparatus used in the generation of through voids in a support member according to one aspect of the invention;

FIGS. 10A-C are examples of cross-sections of a support member having a branched void structure formed according to one aspect of the instant invention;

FIGS. 11A-E are schematics of patterns of land areas, corresponding depressions, and through voids formed in a support member according to one aspect of the present invention;

FIG. 12 is a diagram of a belt/sleeve that has been graved in a criss/cross pattern according to one aspect of the instant invention;

FIGS. 14A-G illustrate support members constructed according to various embodiments of the present invention; and FIG. 15 is a perspective view of a support member according to one aspect of the present invention.

DETAILED DESCRIPTION OF THE PREFERRED EMBODIMENTS

Figure 4B:
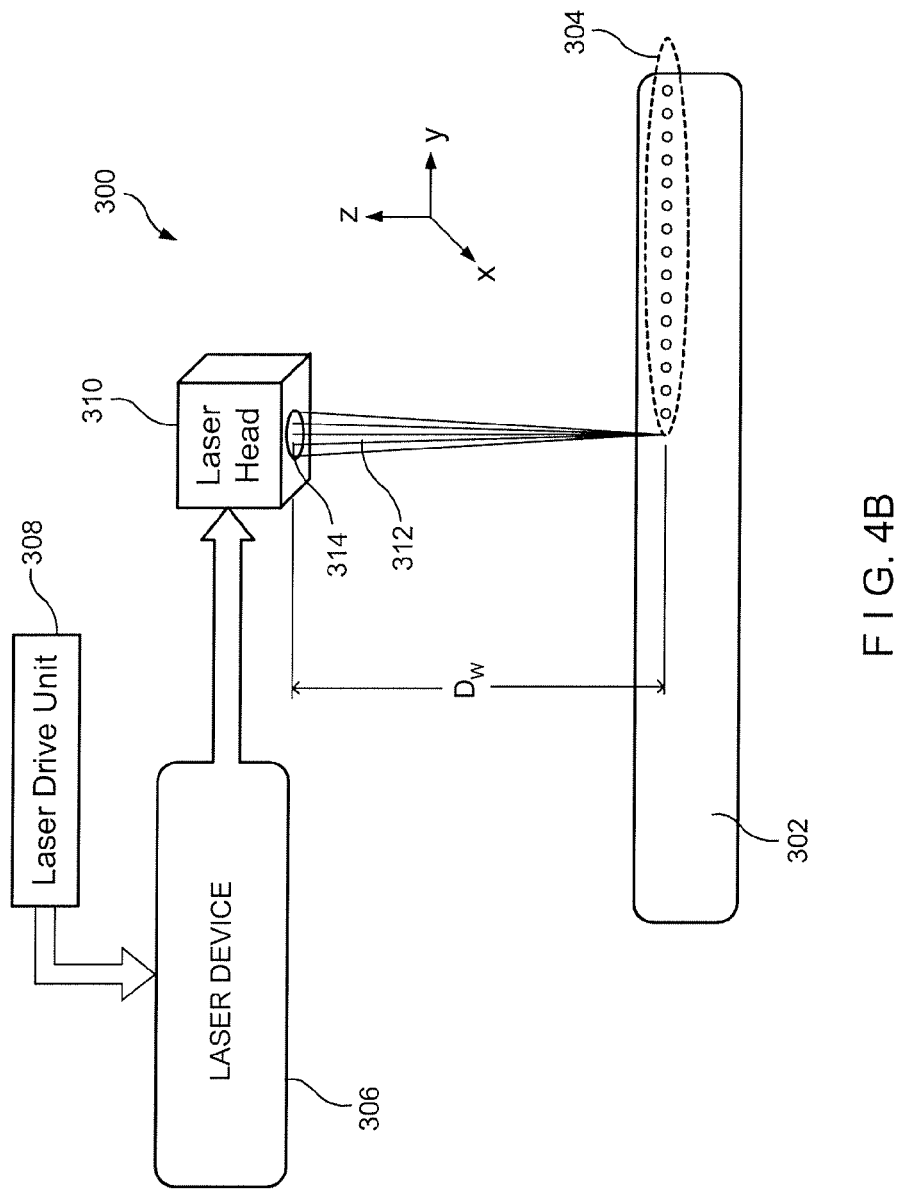

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

The present invention provides a continuous support member for use in the apparatus shown in FIGS. 1 and 2, for example. The nonwoven support member functions in place of a traditional woven support fabric, and aids in imparting desired texture, hand, and bulk to the nonwoven products produced thereon. The support member of the present invention may reduce the manufacturing time and costs associated with the production of nonwovens.

A belt or sleeve, as described herein, has two sides: a web or sheet receiving or contacting side and a machine or back side. The former is so-called because it is the side of the support member that faces the newly formed nonwoven web. The latter is so-called because it is the side of the support member that passes over and is in contact with the rolls or cylinder on the nonwoven production machine.

FIG. 1 depicts an apparatus for continuously producing nonwoven products using a support member in accordance with the present invention. The apparatus of FIG. 1 includes a conveyor belt 80 which actually serves as the topographical support member in accordance with the present invention. The belt is continuously moved in a counterclockwise direction, for example, about a pair of spaced-apart rollers as is well known in the art. Disposed above belt 80 is a fluid ejecting manifold 79 connecting a plurality of lines or groups 81 of orifices. Each group has one or more rows of very fine diameter orifices, each about 0.007 inch in diameter with 30 such orifices per inch. Water is supplied to the groups 81 of orifices under a predetermined pressure and is ejected from the orifices in the form of very fine, substantially columnar, non-diverging streams or jets of water. The manifold is equipped with pressure gauges 88 and control valves 87 for regulating the fluid pressure in each line or group of orifices. Disposed beneath each orifice line or group is a suction box 182 for removing excess water, and to keep the area from undue flooding. The fiber web 83 to be formed into the fabric of the present invention is fed to the topographical support member conveyor belt. Water is sprayed through an appropriate nozzle 184 onto the fibrous web to pre-wet the incoming web 83 and aid in controlling the fibers as they pass under the fluid ejecting manifolds. A suction slot 85 is placed beneath this water nozzle to remove excess water. Fibrous web passes under the fluid ejecting manifold in a counter clockwise direction. The pressure at which any given group 81 of orifices is operated can be set independently from the pressure at which any of the other groups 81 of orifices is operated. Typically, however, the group 81 of orifices nearest spray nozzle 184 is operated at a relatively low pressure, e.g. 100 psi. This assists in settling the incoming web onto the surface of the support member. As the web passes in the counterclockwise direction in FIG. 1, the pressures at which the groups 81 of orifices are operated is usually increased. It is not necessary that each succeeding group 81 of orifices be operated at a pressure higher than its neighbor in the clockwise direction. For example, two or more adjacent groups 81 of orifices could be operated at the same pressure, after which the next succeeding group 81 of orifices (in the counterclockwise direction) could be operated at a different pressure. Very typically, the operating pressures at the end of the conveyor belt where the web is removed are higher than the operating pressures where the web is initially fed into the conveyor belt. Though six groups 81 of orifices are shown in FIG. 1, this number is not critical, but will depend on the weight of the web, the speed, the pressures used, the number of rows of holes in each group, etc. After passing between the fluid ejecting manifold and the suction manifolds, the now formed nonwoven web is passed over an additional suction slot 186 to remove excess water. The distance from the lower surfaces of the groups 81 of orifices to the upper surface of fibrous web 83 typically ranges from about 0.5 inch to about 2.0 inches; a range of about 0.75 inch to about 1.0 inch is preferred. It will be apparent that the web cannot be spaced so closely to the manifold that the web contacts the manifold. On the other hand, if the distance between the lower surfaces of the orifices and the upper surface of the web is too great, the fluid streams will lose energy and the process will be less efficient.

Another apparatus for producing nonwoven fabrics using a support member of the present invention is schematically depicted in FIG. 2. In this apparatus, the topographical support member is a rotatable drum sleeve 191. The drum 90 under the drum sleeve 191 rotates in a counterclockwise direction, for example. The outer surface of the drum sleeve 191 comprises the desired topographical support configuration. Disposed about a portion of the periphery of the drum is a manifold 89 connecting a plurality of orifice strips 92 for applying water or other fluid to a fibrous web 193 placed on the outside surface of the curved plates. Each orifice strip may comprise one or more rows of very fine diameter holes or apertures of the type mentioned earlier herein. Typically, the apertures are approximately 0.005 to 0.010 inches in diameter. There may be as many as 50 or 60 holes per inch or more if desired. Water or other fluid is directed through the rows of orifices. In general, and as explained above, the pressure in each orifice group is typically increased from the first group under which the fibrous web passes to the last group. The pressure is controlled by appropriate control valves 97 and is monitored by pressure gauges 98. The drum is connected to a sump 94 on which a vacuum may be pulled to aid in removing water and to keep the area from flooding. In operation, the fibrous web 193 is placed on the upper surface of the topographical support member before the water ejecting manifold 89 as seen in FIG. 2. The fibrous web passes underneath the orifice strips and is formed into a nonwoven fabric in accordance with the present invention. The formed fabric is then passed over a section 95 of the apparatus where there are no orifice strips, but vacuum is continued to be applied. The fabric after being de-watered is removed from the drum and passed around a series of dry cans 196 to dry the fabric.

Turning now to the structure of the support members, such as the belt or sleeve described above, the support members may have a topography of through voids. The through voids may include, among other things, geometrical characteristics that provide enhanced sheet topography and bulk to the nonwoven products or sheets/web when produced, for example, on support member 80, 191. Another advantage of the instant support members is easier web release from the support member.

In addition, support members constructed in accordance with the instant invention will result in deeper "impressions" resulting in a nonwoven product with higher bulk absorbency and lower density. It will be appreciated that the term "through void" is synonymous to the term "through hole" and represents any opening that passes entirely through a support member such as a belt or sleeve. A support member as referred to herein includes, but is not limited to, industrial fabrics such as belts or conveyors, and sleeves or cylindrical belts specifically used in nonwoven production Yet another advantage is that the construction of the support belt/sleeve avoids the constraints of and need for a conventional weaving loom since the through voids, grooves, or other patterns can be placed in any desired location or pattern and thus the aesthetics of the sheet/web appearance may be improved. The surface of the support belt/sleeve can be processed in order to create a pattern by cutting or graving a pattern e.g. a honeycomb structure, and/or can be treated with a chemical coating for a specific application such as static dissipation, contamination/soil release, improving durability etc. The use of the inventive support member allows a better reflection of energy when compared to a prior art standard woven belt. This improves entangling of fibers in the non-woven product and prevents fiber penetration into the support belt apertures/holes/voids, which can lead to fiber loss or difficulty in releasing the nonwoven cleanly and uniformly from the support belt/sleeve, as may be observed in woven belts or support members. The result is: better fiber entanglement and less fiber picking, resulting in better product release or transfer from this support member to another position or support member.

One method of producing a support member, such as a belt or sleeve, according to one embodiment of the present invention is shown in FIGS. 4A and 4B, for example. FIGS. 3A and 3B illustrate a plan view of a plurality of through voids 102 that are produced in a portion of a continuous support member 104 in accordance with the method illustrated in FIGS. 4A and 4B, for example. The through voids can serve as drainage holes in some applications for allowing passage of fluid, water and/or air. FIG. 3A shows the plurality of through voids 102 from the perspective of a top or sheet contact side surface 106 of the support member 104. Each through void 102 may have a conical shape, where the inner surface 108 of each through void 102 tapers inwardly from the opening 110 on the top surface 106 through to the opening 112 (FIG. 3B) on the bottom or machine side surface 114 (FIG. 3B) of the support member 104. The diameter along the x-coordinate direction for opening 110 is depicted as $\Delta x_1$ while the diameter along the y-coordinate direction for opening 110 is depicted as $\Delta y_1$. Referring to FIG. 3B, similarly, the diameter along the x-coordinate direction for opening 112 is depicted as $\Delta x_2$ while the diameter along the y-coordinate direction for opening 112 is depicted as $\Delta y_2$. As is apparent from FIGS. 3A and 3B, the diameter $\Delta x_1$ along the x-direction for the opening 110 on the top side 106 of support member 104 is larger than the diameter $\Delta x_2$ along the x-direction for the opening 112 on the bottom side 114 of support member 104. Also, the diameter $\Delta y_1$ along the y-direction for the opening 110 on the top side 106 of support member 104 is larger than the diameter $\Delta y_2$ along the y-direction for the opening 112 on the bottom side 114 of support member 104. Alternatively, the opposite geometry can also be used. For example, the diameter of the openings on the sheet contact side surface can be greater than the diameter on the openings on the machine side surface.

FIG. 4A illustrates a cross-sectional view of one of the through voids 102 depicted in FIGS. 3A and 3B. As previously described, each through void 102 may have a conical shape, where the inner surface 108 of each through void 102 tapers inwardly from the opening 110 on the top surface 106 through to the opening 112 on the bottom surface 114 of the support member 104. The conical shape of each through void 102 may be created as a result of incident optical radiation 202 generated from an optical source such as a $CO_2$ or other laser device. By applying laser radiation 202 of appropriate characteristics (e.g., output power, focal length, pulse width, etc.) to, for example, a nonwoven support member, a through void 102 may be created as a result of the laser radiation perforating the surfaces 106, 114 of the support member 104. Mechanical perforation or punching may also be used to produce the through voids or openings described above.

As illustrated in FIG. 4A, according to one aspect, the laser radiation 202 creates, upon impact, a first raised edge or ridge 204 on the top surface 106 and a second raised edge or ridge 206 on the bottom surface 114 of the support member 104. These raised edges 204, 206 may also be referred to as a raised rim or lip. A plan view from the top for raised edge 204 is depicted by 204A. Similarly, a plan view from the bottom for raised edge 206 is depicted by 206A. The height of each raised edge 204, 206 may be in the range of 5-10 μm. The height is calculated as the level difference between surface of the support member and the top portion of the raised edge. For example, the height of raised edge 204 is measured as the level difference between surface 106 and top portion 208 of raised edge 204. Raised edges such as 204 and 206 provide, among other advantages, local mechanical reinforcement for each through void or through hole. Also, deeper voids result in deeper "impressions" in the nonwoven produced, and also result in, for example, more bulk and lower density. It is to be noted that $\Delta x_1/\Delta x_2$ may be 1.1 or higher and $\Delta y_1/\Delta y_2$ may be 1.1 or higher in all cases. Alternatively, the opposite geometry may also be used. For example, the diameter of the voids or openings on the sheet contact side surface can be greater than the diameter of the voids or openings on the machine side surface. Alternatively, in some or all cases, $\Delta x_1/\Delta x_2$ may be equal to 1 and $\Delta y_1/\Delta y_2$ may be equal to 1, thereby forming through voids of a cylindrical shape. Additionally, the "ridge" can be on one or both surfaces.

While the creation of through voids having raised edges in a support member may be accomplished using a laser device, it is envisaged that other devices capable of creating such effects may also be employed. Mechanical punching or embossing then punching may be used. For example, the nonwoven support member may be embossed with a pattern of protrusions and corresponding depressions in the surface in the required pattern. Then each protrusion for example may be mechanically punched or laser drilled.

FIG. 4B illustrates an exemplary embodiment of a system 300 for generating through voids 304 in a support member 302. System 300 may include a laser device 306, a laser drive unit 308, a laser head 310, and mechanical fixtures 316 upon which the support member 302 is placed.

The laser drive unit 308 controls the various conditions that vary the output generated by the laser. For example, the drive unit 308 may allow for the adjustment of output power from the laser and the provision of various modulation characteristics. For instance, the laser may be pulsed over a fixed or continuous time period, whereby the pulse width may be adjusted over a particular range.

The laser head 310 delivers incident optical radiation 312 to the support member 302 via nozzle 314 for creating the through voids 304. The incident optical radiation 312 may be subjected to various beam shaping components prior to being released from the nozzle 314. For example, different optical lens arrangements may be used to achieve a desired working distance (i.e., $D_w$) between the nozzle 314 of the laser head 310 and the top surface of the support member 302. Also, optical splitters, isolators, polarizers, slits, and/or other components may be used to vary different attributes associated with the incident optical radiation 312 output from the laser head 310. For example, control of spot-size and spot-shape may be one desired attribute. In effect, the incident optical radiation is drilling (or cutting) through holes or through voids in the support member 302. The same apparatus can also be used to grave or etch patterns of grooves, continuous or discontinuous, straight, wavy, or sinusoidal in the surface. Logos can also be etched as well.

The support member 302 may be mounted or placed on a suitable apparatus 320 (e.g., as shown in FIG. 5) that has different motorized components, rails, rollers, etc., in order to facilitate the movement of the support member 302 and/or the laser head 310 in a specific x-y coordinate direction. By controlling the movement of the support member 302 along the x-y coordinate direction, a topography of through voids, grooves, patterns, logos etc. may be created on the support member according to different desired patterns. In addition to the movement in the x-y direction, working distance $D_w$ may be varied by mounting the laser head 310 on a motorized platform that provides movement along a z-coordinate direction. It may be possible to design a system whereby the laser head moves in three-dimensions while the support member remains fixed. Alternatively, the laser head may traverse across the support member in a widthwise "x" or CD (cross machine direction) manner while the support member moves in the machine direction (MD) or "y" axis. It may also be possible to setup a system where the support member is moved in three-dimensions relative to a mechanically fixed laser head.

FIG. 5 illustrates an exemplary embodiment of an apparatus 320 used in the generation of through voids in a belt or sleeve, according to one aspect of the invention. Support member 322 shown in FIG. 5 should be understood to be a relatively short portion of the entire length of the support member 322. Where the support member 322 is endless, it would most practically be mounted about a pair of rolls, not illustrated in the figure but most familiar to those of ordinary skill in the nonwoven production arts. In such a situation, apparatus 320 would be disposed on one of the two runs, most conveniently the top run, of the support member 322 between the two rolls. Whether endless or not, however, support member 322 is preferably placed under an appropriate degree of tension during the process. Moreover, to prevent sagging, support member 322 may be supported from below by a horizontal support member as it moves through apparatus 320.

Referring now more specifically to FIG. 5, where support member 322 is indicated as moving in an upward direction through the apparatus 320 as the method of the present invention is being practiced, apparatus 320 comprises a sequence of several stations through which support member 322 may pass incrementally as the belt or sleeve is being manufactured therefrom.

The belt or sleeve described in the above-embodiment is one example of a support member that would be produced according to the systems and methods described herein. The desirable characteristics of the described through voids created in the belt or sleeve would enhance one or more characteristics associated with a nonwoven product manufactured on the spunlace or hydroentangling machine.

Figure 6:
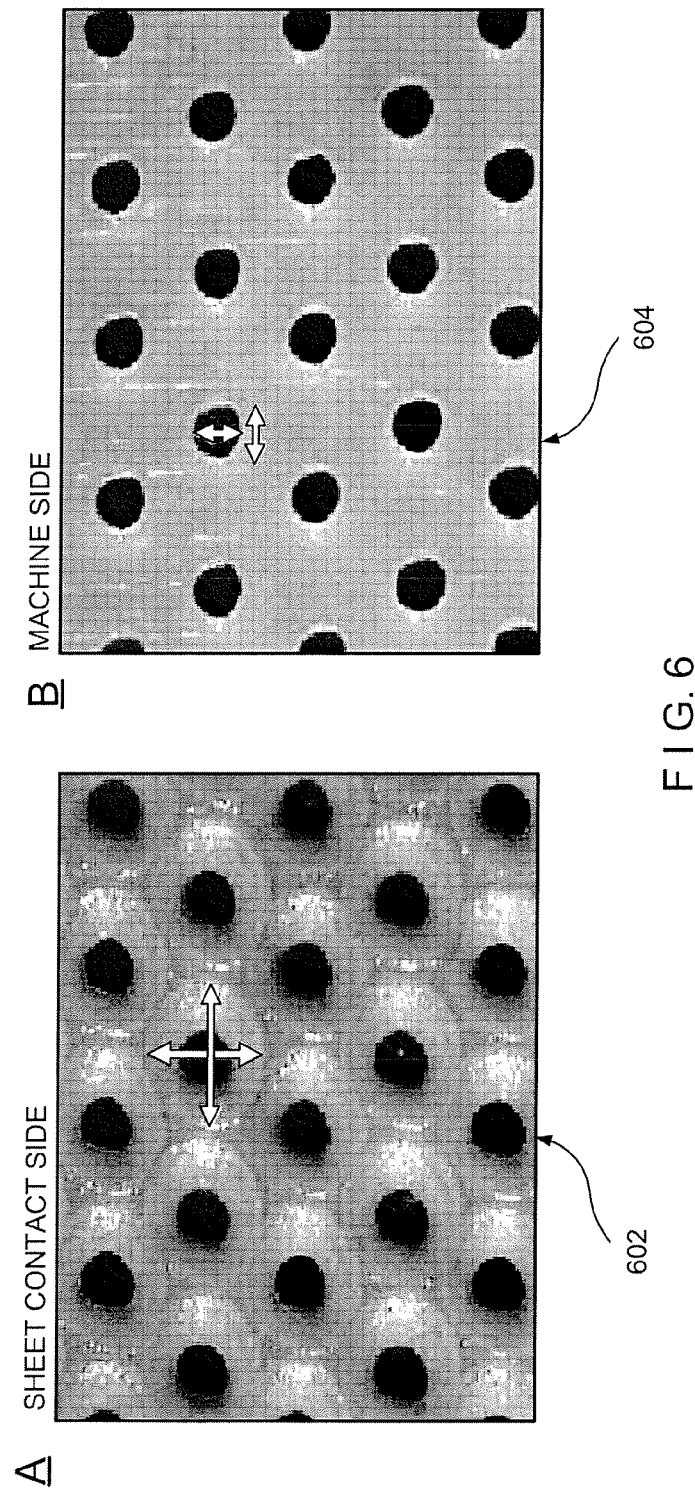
FIG. 6 illustrates images of a support member produced in accordance with one aspect of the instant invention.

FIG. 6 illustrates images of sheet contact side and machine side of a support member manufactured in accordance with one aspect of the instant invention. Image 602 illustrates through voids in a support member, as observed from the top or sheet contact side surface of the support member. Image 604 illustrates the through voids, as observed from the bottom surface (i.e., machine side) of the support member. The through void criteria was to achieve round shaped through voids having a higher open area on the sheet contact side surface. As seen in images 602 and 604, larger openings (FIG. 6) are on the sheet contact side surface relative to the openings on the machine side surface (FIG. 6). The through voids may be drilled using a $CO_2$ laser that may be programmed or operated to generate optical pulses of a predefined pulse width over a predefined time period.

Figure 7:
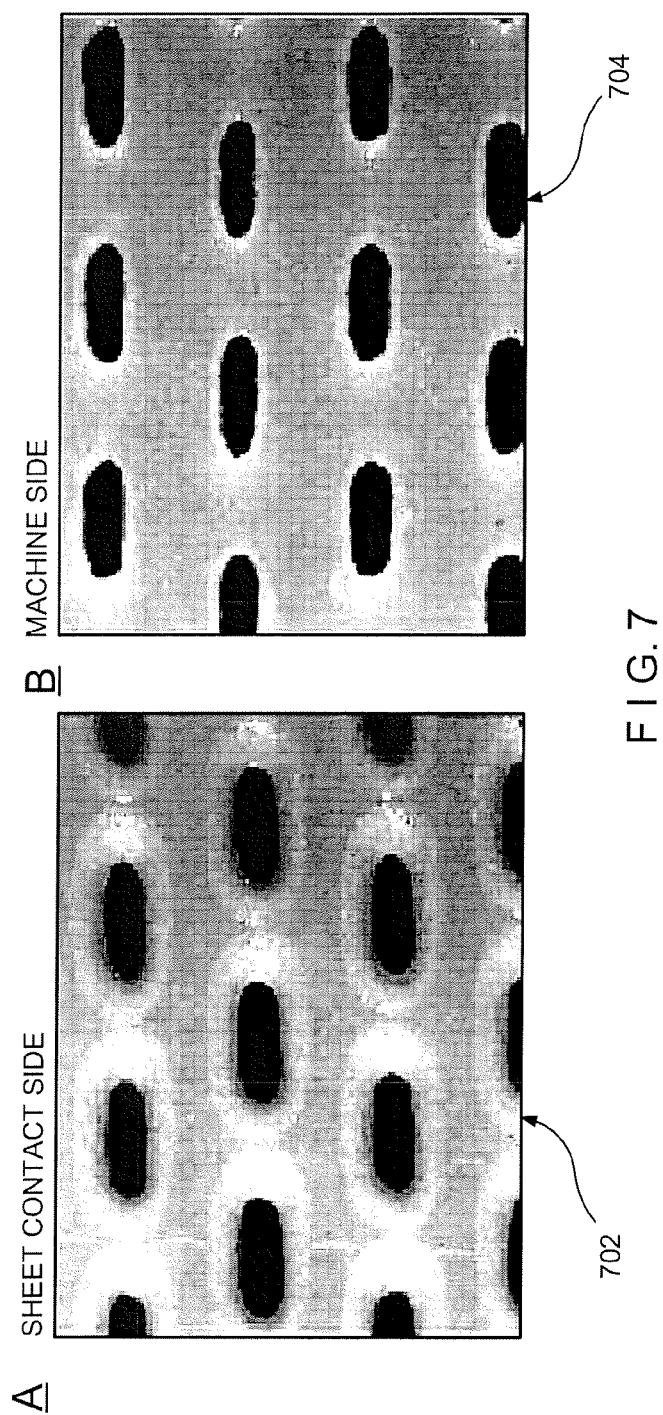
FIG. 7 illustrates images of a support member produced in accordance with another aspect of the instant invention.

FIG. 7 illustrates images of a support member manufactured in accordance with one aspect of the instant invention. Image 702 illustrates through voids in a support member, as observed from the top surface (i.e., sheet contact side) of the support member. Image 704 illustrates the through voids, as observed from the bottom surface (i.e., machine side) of the support member. The through void criteria, in this instance, was to achieve oval shaped through voids having a higher open area on the sheet contact side surface relative to the opposite side or machine side surface of the support member. Images 702 and 704 show larger openings (FIG. 7) on the top or sheet contact side surface relative to the openings on the bottom or machine side surface (FIG. 7). These through voids may also be drilled using a $CO_2$ laser that may be programmed or operated to generate optical pulses of a predefined pulse width over a predefined time period. As illustrated in FIG. 7, the shape of the through holes are substantially oval shaped in comparison to the through voids shown in FIG. 6. Different factors and/or parameters (e.g., drilling speed) may contribute to the differences in through void shape and through void open areas (%) corresponding to both the sheet contact side and machine side of the support member.

Figure 8:
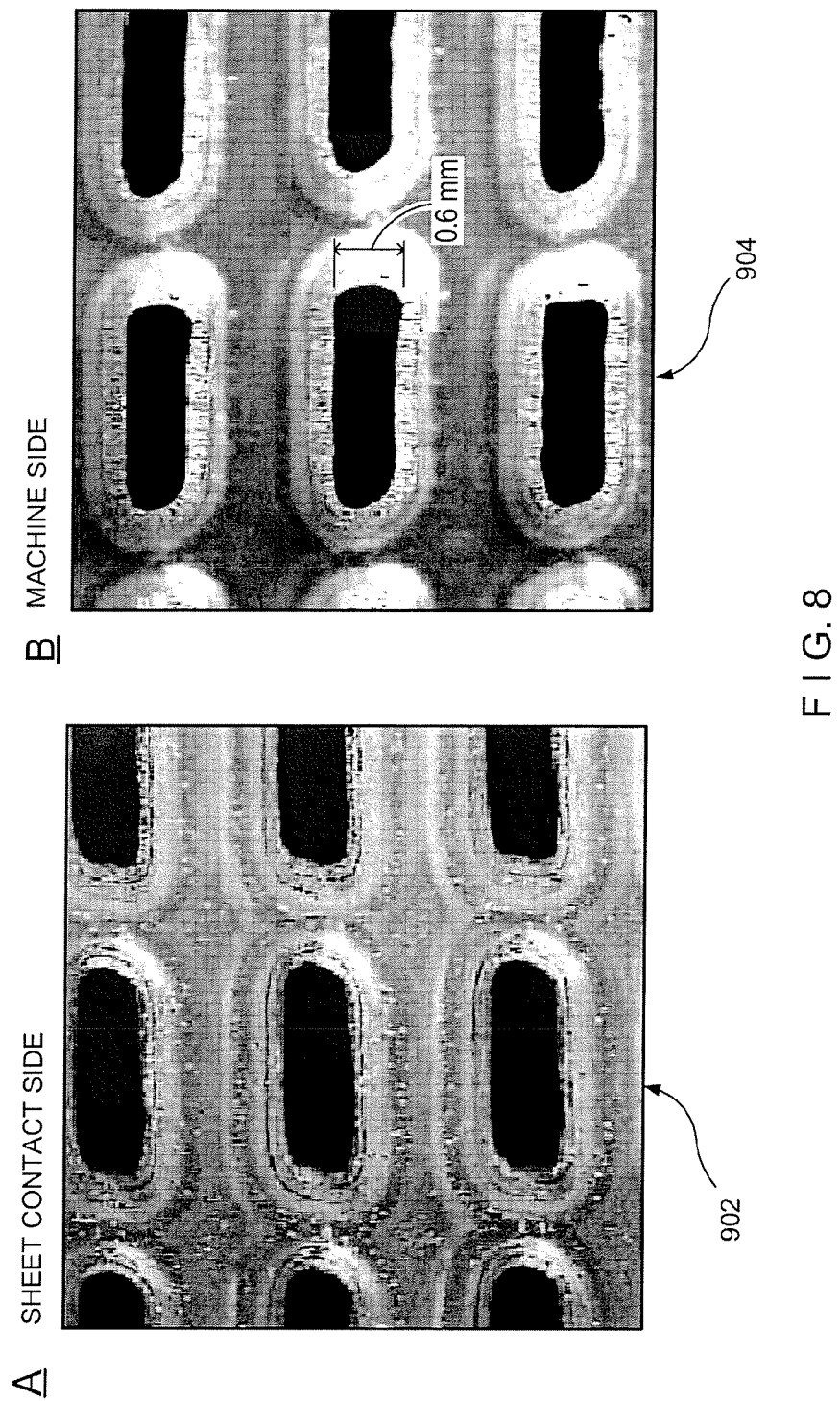
FIG. 8 illustrates images of both top and bottom surfaces of a support member produced in accordance with one aspect of the instant invention.
Figure 9:
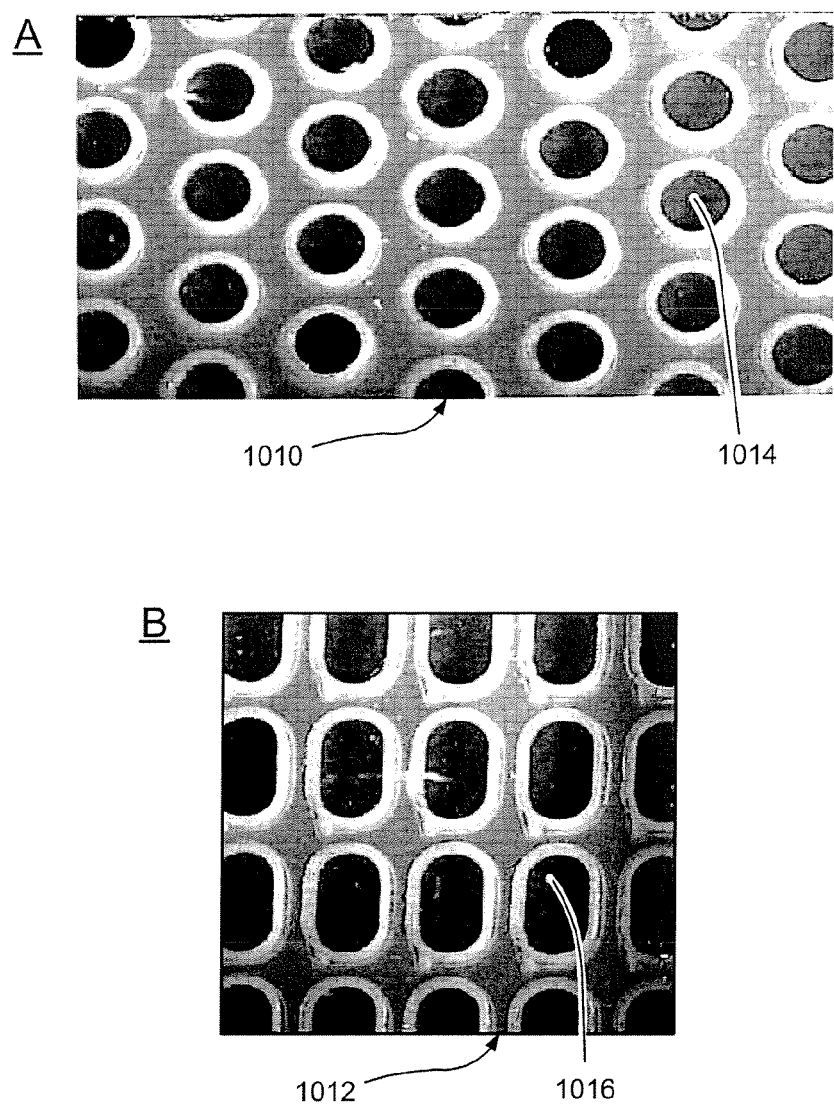
FIG. 9 depicts several through voids generated according to yet another aspect of the instant invention.

In a similar example, FIG. 8 illustrates the images of both the sheet contact side surface 902 and machine side surface 904 of the through voids where the shape of the top and bottom openings of the through voids are substantially rectangular in shape. Similarly, according to another exemplary embodiment, FIG. 9 depicts several void patterns from experimental trials for generating through voids according to yet another aspect of the instant invention. In some instances, through voids of an increased size may be desired. For example, images 1010 and 1012 depicted in FIG. 9 correspond to through voids that are generated based on different operating parameters such as, but not limited to, drilling speed, wobulation frequency, wobulation index, laser output power, etc. Accordingly, the shape of the surface openings 1014 for the through voids corresponding to image 1010 is substantially round, while the shape of the surface openings 1016 for the through voids associated with image 1012 is substantially rectangular. One factor, among others, affecting the shape of surface openings may be the scanning speed (i.e., mm/s) of the laser as the incident radiation moves from one position to the next in order to generate a subsequent through void in the support member.

In another embodiment, a support member structure comprises a sheet contact side surface having a branched void structure adapted to impart texture to a nonwoven product. FIG. 10A shows the cross-section of the surface of a support member structure 10 with a branched void or opening 11 which comprises a plurality of small holes 10a and 10b on the sheet contact side 12 that are inclined such that they merge into a larger void 10c at an opposing side 14 of the surface. As illustrated, the branched opening 11 may also be formed to include raised edges or rims 16 adjacent the circumference of holes 10a and 10b. Although not shown in FIG. 10A, raised edges or rims may also be formed adjacent the circumference of the larger void 10c on the opposing side 14 of the support member structure. Although holes 10a and 10b are shown as merging into void 10c, a branched void structure having three or more holes, for example 10a, 10b, 10c, 10d, merging into a larger void 10e may be contemplated, such as that shown in FIGS. 10B-C, whereby raised rims may be formed adjacent to either or both the smaller sheet contact side holes and the larger opposing side void. The voids can be straight (cylindrical) or conical. For instance, conical holes of different patterns could be designed such that they are larger and well distributed over one side such as a web contact surface, whereas the voids on the opposing machine side surface could be substantially aligned along the MD, thereby providing, for example, increased drainage. This branched void can be formed in a structure as shown or in a laminated substrate. The voids can be created by any number of perforation methods or combination thereof, including laser drilling, mechanical punching, and embossing. For example, the voids could be created by combining laser drilling with embossing or laser perforation with laser etching/graving, etc.

Such a structure allows for a high number of small holes in a support member structure while also allowing for low long term elongation for the support member in the machine direction MD while allowing for high bending stiffness in the cross machine direction CD. Such a structure can also be adapted such that, for example, it allows for holes in the support member structure that are smaller in diameter than the substrate thickness without resulting in, for example, plugged holes due to contamination.

Larger diameter voids on a top side surface and smaller diameter voids on an opposing machine side surface could, for instance, capture, shape, and/or orient fibers disposed on the support member structure in a desired pattern and create a high bulk nonwoven product.

FIGS. 11A-11E are patterns of land areas and corresponding depressions formed by, for example, graving or cutting, where the shaded areas represent land areas 62. FIG. 11D shows a void or hole 66 in land areas. Surface patterns can be adapted to be uniform and repeatable, nonuniform and repeatable, as well as nonuniform and random. Land areas 62 of the surface pattern include discrete islands 62 or continuous areas (not shown), and the depressions 64 can include discrete islands (not shown) or continuous areas 64. The shape of the island can be round, oblong, square, rectangular, trapezoidal, pentagonal, hexagonal, diamond, frustoconical, triangular, or another polygonal shape. At FIG. 11A, the pattern has about 3 land areas 62 per $cm^2$. In FIGS. 11B and 4D, the pattern includes rectangular, discreet land areas 62 about 2.0 mm by 1.0 mm, and continuous depressions 64 that separate directional columns 63a, 63b of the discreet land areas 62 by about 1.0 mm. Alternate columns 63a of the land areas 62 are separated by depressions 64a of about 1.0 mm.

In FIG. 11C, the pattern includes rectangular, discreet land areas 62 about 0.5 mm by 1.0 mm, and continuous depressions 64a that separate directional columns 63a, 63b of the discreet land areas are about 0.5 mm. Alternate columns 63a of the land areas 62 are separated by depressions 64a of about 0.5 mm. FIG. 11E shows a pattern that includes a diagonally cross-hatched pattern of continuous land areas 62 and discreet, square or diamond shaped depressions 64, where the depressions and the land areas are each about 1 mm in width, and the discreet depressions 64 are about 1.0 mm².

FIG. 12 is a diagram of a belt/sleeve 70 produced according to one embodiment of the invention. As shown, belt/sleeve 70 has been graved in a criss-cross pattern such that pairs of voids 76 are located in the recesses 71 where they criss-cross at certain predetermined locations. In this manner, the voids 76 are oriented along generally MD lines. The placement of the voids 76 also contributes to the texture of the resultant nonwoven product by causing localized fiber reorientation as a fluid (air or water or both) passes through the void 76 from the textured surface through the rest of the structure.

Figure 13A:
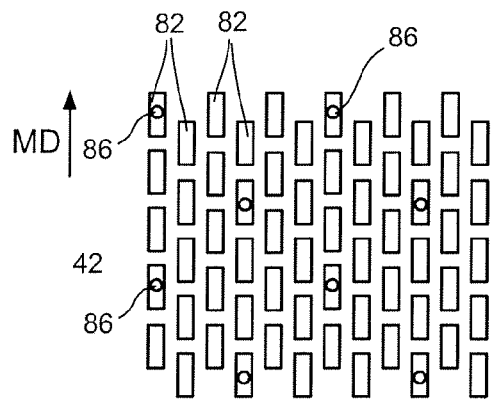
FIGS. 13A-C are schematics of patterns of land areas, corresponding depressions, and through voids formed in a support member according to one aspect of the instant invention.
Figure 13B:
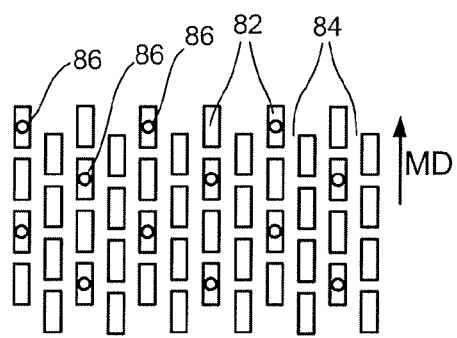
Figure 13C:
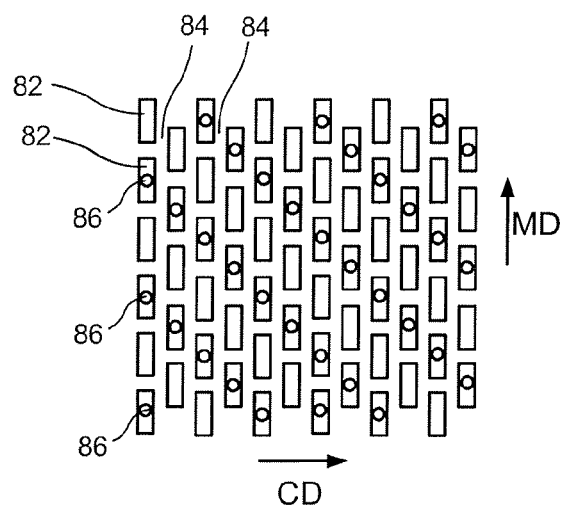

FIGS. 13A-C show different patterns of lands 82 and depressions 84 with through holes 86 in a desired pattern through some of the lands. The continuous lands 82 or the depressions 84 can be straight with respect to the MD, straight with respect to the CD; at an angle to the MD or CD, or in two distinct sets at an angle to the MD or CD. The angles of the two sets can be the same angles or at different angles. The continuous lands 82 or the depressions 84 can be curvilinear or straight. Also the continuous lands 82 or the depressions 84 can be both curvilinear and straight; or the continuous lands 82 or the depressions 84 can have sections which are curvilinear and straight. The depressions can be formed by any one of embossing, cutting, or graving. As shown at FIG. 13A, the pattern has about 4 holes 86 per cm² at every third pattern in the CD and the MD, whereas at FIG. 13B the pattern has about 7 holes 86 per cm² at every second pattern in the CD and every second pattern in the MD, and FIG. 13C shows about 12 holes 86 per cm². In each of FIGS. 13A-C, the voids 86 are shown as in the land areas 82, which are discreet islands and rectangular.

It is to be noted as aforementioned that normally belts used to produce nonwovens do not impart significant structure to the nonwoven product made thereon other than that obtained by the yarn weave patterns and knuckles. Such structure is limited to the practical sizes of the yarns that can be used to weave the fabric. "Structure" pertains to variations in the basis weight and/or the density of the nonwoven which are greater than those that occur in ordinary nonwoven making processes and due to ordinary variations. "Structure" may also, however, refer to a texture or a pattern or a design in the fibrous nonwoven web. Such "structured" nonwoven products are usually soft and bulky with high absorbency. Structured nonwovens can be softer, more absorbent, and be of a lower basis weight than unstructured nonwoven product. The belts or sleeves according to the present invention provide the required structure, basis weight, density, texture, feel and/or pattern to the nonwoven product produced thereon.

As shown in FIGS. 14A-G, in yet another embodiment, the belt or sleeve can be made from an extruded or laminated film 91 in which defined holes 96 are made in order to reach the desired air permeability. A support structure (not shown) can be attached to one or both sides of one or both films 91a, 91b. These holes 96 can have different diameters from about 0.2 mm up to about 5.0 mm, and the holes 96 can be constructed to be at different angles with respect to the plane of the support member. The shape of the holes 96 can be round, square, oval or any given shape, such as a star shape.

As shown in FIG. 14A the position of the holes 96 on the surface of the support member can be uniformly or randomly distributed. The holes 96 can also be distributed such that that have a specific density in a given area of the support member or distributed uniformly over the entire surface, depending on, for example, the requirements of the nonwoven product being produced. The voids 96 can also take the form of lines, which are cut or graved into the support member to create patterns, for example, logos. The support member can be produced with a layer or a plurality of layers of polymer films 91a, 91b, with or without fiber reinforcement (woven or not). The support member structure can also be made as a "sandwich" component with woven or nonwoven layer laminated between a plurality of polymer films as can be the case with any of the substrates already described herein. This reinforcement can increase the mechanical stability of the fabric structure.

The surface of the support member can be graved in order to create topography such as a honeycomb or other pattern, or can be further treated for a specific application such as static dissipation, or anti-contamination. The surface of the support member can also be graved to create topography for different patterning applications as well as logos.

Figure 14F:
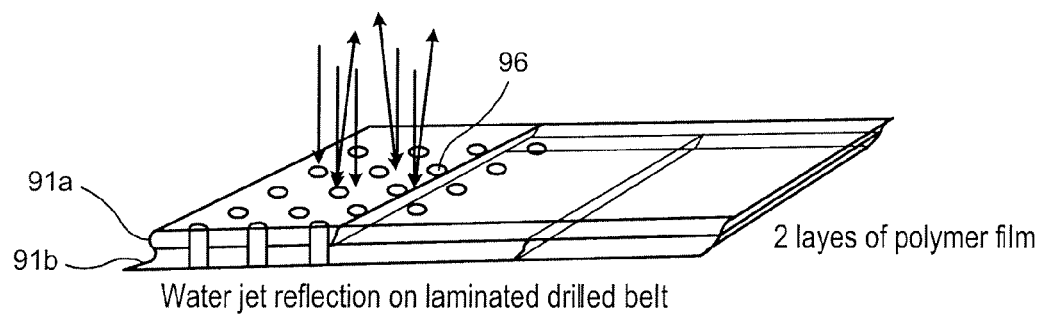

As shown at FIG. 14F the use of this type of support member allows for a better reflection of energy when used on a water jet process (hydroentangling) as compared to a standard woven belt. The structure results in, for example, improved entangling of fibers as well as preventing the penetration of fibers that are caught in the interstices or yarn crossovers of a woven structure, for example. The result of this better fiber entanglement and reduced fiber picking is, for example, better nonwoven product release or transfer from this support member belt to the next position in the process.

Figure 14G:
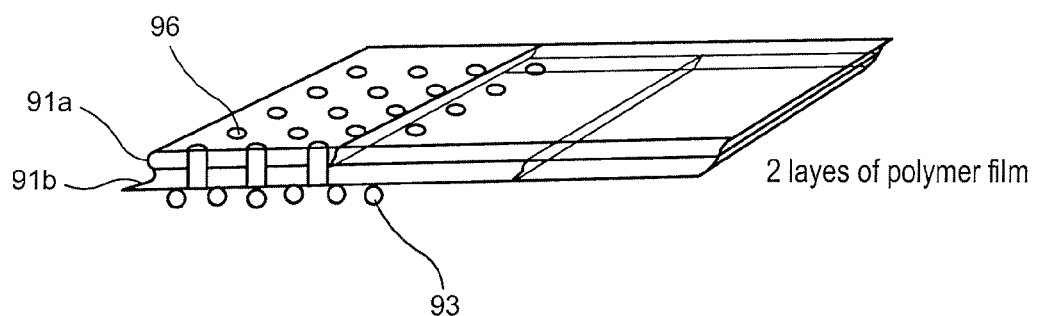

As shown in FIG. 14G, the machine side of the fabric structure can also be made with a surface topography, grooves, or added monofilament 93 in order to create higher drainage.

FIG. 13 is a perspective view of a continuous support member or belt or sleeve 1110 formed according to one exemplary embodiment of the invention. According to this embodiment, the belt or sleeve 1110 has an inner surface 1112 and an outer surface 1114, and is formed by spirally winding a media strip 1116 produced using one of the several methods and systems discussed above. Media strip 1116 may be spirally wound in a plurality of abutting and mutually adjoined turns, substantially longitudinal direction around the length of the belt or sleeve 1110 by virtue of the helical fashion in which the belt or sleeve 1110 is constructed.

An exemplary method by which the belt or sleeve 1110 may be manufactured is described in U.S. Provisional Application No. 61/121,998 filed on Dec. 12, 2008, and U.S. Provisional Application No. 61/147,637 filed Jan. 27, 2009, the entire contents of which is incorporated herein by reference. The media strip 1116 may be, for example, a ribbon or an industrial strapping material as described therein. Because the belt 1110 is produced by spirally winding a media strip 1116, and is not a woven support member, the outer surface 1112 of the belt or sleeve 1110 is smooth and continuous, and lacks the knuckles which prevent the surfaces of a woven support member from being perfectly smooth. Preferably, the media strip may be a strip of thermoplastic material, such as a film, foil, or strapping, for example, and may be made of any polymeric material, preferably polyester (PET). However, other materials such as other polyesters (e.g., polyethylene naphthalate (PEN)) or polyphenylene sulphide (PPS) could also be used. Polyamides, or polyether ether ketones (PEEK) may also be used. With respect to a laminate of two or more layers, each layer can be the same or formed of different materials. The film, foil, or strapping can be uniaxially or biaxially oriented with sufficient modulus and stability in both MD and CD to function in the intended manner. In addition, the film, foil, or strapping may contain reinforcing fibers in the MD or CD, or both MD and CD, or in any random direction. The reinforcing fibers may be included through an extrusion or pultrusion process where the fibers may be extruded or pultruded along with the material forming the film or foil. Reinforcing fibers may be formed of a high-modulus material, such as for example, aramids, including but not limited to Kevlar® and Nomex®, and may provide extra strength, modulus, tear and/or crack resistance to the film or foil.

The media strip can also be coated, for example, to enhance sheet release, and/or structural integrity of the media strip. The aforesaid structures may then be perforated and patterned in a manner as heretofore described.

The inventive support member may include one or more additional layers on top of or under the base substrate, merely to provide functionality, and not reinforcement. For example, the additional layers used may be any of woven or nonwoven materials, MD and/or CD yarn arrays, spirally wound strips of woven material that have a width less than the width of the support member, fibrous webs, films, or a combination thereof, and may be attached to the substrate using any suitable technique known to one of ordinary skill in the art. Lamination by thermal bonding and chemical bonding are but a few examples.

The use of a support member as described herein may result in a nonwoven product with higher caliper and lower density than obtained using prior art fabrics. The high caliper and low density results in a softer product having an increased absorbency, both of which are very desired characteristics.

The support member or belt or sleeve of the present invention can have a air permeability in the range of 100-500 cfm. Additional layers may be added, if required. The support member can be made of any polymeric material as discussed above, such as extrudable thermoplastics or room temperature, UV, or heat cross-linkable resins, in the polyester, acrylic or polyurethane families, for example. Materials are selected so as to ensure functionality in the spunlacing process where entangling shower pressures of up to 250 bars may be employed.

Although a preferred diameter for the holes or through voids is described in the above embodiment, the holes or through voids can have different diameters ranging from 0.01 mm to 5 mm with different entry angles on the belt's or sleeve's surface. The shape of the holes can be round, square, oval or any specific shape such as a star shape. The holes on the surface of the conveyor can be randomly positioned or with specific density in some areas or uniformly on the surface depending on the required effect. In addition to holes, lines, grooves or logos can be graved or etched into the support member. The support member can also be made as a laminate with a woven or nonwoven layer laminated between two or more layers of a polymeric film, for example. This reinforcement increases the mechanical characteristics and stability of the final product.

The surface of the support member can be treated with a chemical coating for specific applications such as static dissipation, contamination/soil release, improving durability etc. The use of this type of a support member allows a better reflection of hydraulic energy when compared to a standard woven belt. This improves entangling of fibers in the nonwoven and prevents fiber penetration into the support belt apertures/holes/voids, which can lead to fiber loss or difficulty in releasing the nonwoven cleanly and uniformly from the support belt/sleeve, as may be observed in woven belts or conveyors. The result is: better fiber entanglement and less fiber picking, resulting in better product release or transfer from this conveyor to another position or conveyor. The machine side of the support member can be provided with a surface topography or grooves or can be laminated with monofilaments in order to create higher drainage.

The end result is an improved belt or sleeve that functions in place of a traditional woven belt or sleeve, and imparts desired physical characteristics, such as bulk, appearance, texture, absorbency, strength, and hand to the nonwoven products produced thereon.

Although preferred embodiments of the present invention and modifications thereof have been described in detail herein, it is to be understood that this invention is not limited to these precise embodiments and modifications, and that other modifications and variations may be effected by one skilled in the art without departing from the spirit and scope of the invention as defined by the appended claims.

What is claimed is:

1. A continuous nonwoven support member for use in a spunlace or hydronentanglement process, the support member comprising:
   a plurality of through voids, said through voids each comprising:
   a first opening associated with a top surface of said support member;
   a second opening associated with a bottom surface of said support member, wherein said top surface is a sheet contact side surface and said bottom surface is a machine side of said support member; and
   at least one raised edge circumferentially adjacent to at least one of said first and second openings, wherein said raised edge forms a continuous raised rim around said opening.

2. The support member as claimed in claim 1, wherein each of said plurality of through voids includes a substantially conical or cylindrical shaped inner surface.

3. The support member as claimed in claim 1, wherein said first raised edge and/or said second raised edge is at a height level that is about 5-10 μm above said top surface.

4. The support member as claimed in claim 1, wherein said through voids are formed in a media strip forming one or more layers of said support member.

5. The support member as claimed in claim 4, wherein said media strip is a film, foil, or industrial strapping material.

6. The support member as claimed in claim 5, wherein said film, foil, or strapping material comprises reinforcing fibers in MD, CD, or MD and CD, or in a random direction.

7. The support member as claimed in claim 1, wherein said top surface of said support member is coated to enhance sheet release, static dissipation, contamination/soil release, durability and/or structural integrity.

8. The support member as claimed in claim 4, wherein the media strip is spirally wound to produce a desired length and width of the support member.

9. The support member as claimed in claim 1, wherein the support member has an air permeability in the range of 100-500 cfm.

10. The support member as claimed in claim 1, wherein said support member is an endless belt, made endless seamable belt or sleeve.

11. The support member as claimed in claim 1, wherein the first opening and second opening have a diameter in the range of 0.01 mm to 5 mm.

12. The support member as claimed in claim 1, further comprising a plurality of land areas and corresponding depressions.

13. The support member as claimed in claim 12, wherein the plurality of through voids are formed on the plurality of land areas on the top surface of the support member.

14. The support member as claimed in claim 12, wherein the plurality of through voids are formed in depressions on the top surface of the support member.

15. The support member as claimed in claim 1, further comprising a plurality of grooves to create a topographical pattern for a patterning application.

16. The support member as claimed in claim 15, wherein said grooves are continuous or discontinuous.

17. The support member as claimed in claim 1, wherein said support member has a branched void structure, wherein said plurality of through voids on the top surface join to form a larger void on the bottom surface of said support member.

18. The support member as claimed in claim 1, wherein said support member is a laminate with a woven or nonwoven layer laminated between a plurality of polymer films, foils, or strapping materials.

19. The support member as claimed in claim 1, wherein said through voids are oval, round, substantially rectangular, or star shaped on said top surface and/or said bottom surface.

20. The support member as claimed in claim 1, wherein said through voids are produced by laser drilling, mechanical punching, embossing, etching/graving or a combination thereof.

21. The support member as claimed in claim 1, wherein said support member is a laminate with a plurality of monofilaments attached to the machine side of the support member.

22. A method of forming a continuous nonwoven support member for use in a spunlace or hydronentanglement process, said method comprising the steps of:
  producing a first opening associated with a top surface of said support member;
  producing a second opening associated with a bottom surface of said support member, wherein said top surface is a sheet contact side surface and said bottom surface is a machine side of said support member; and
  producing at least one raised edge circumferentially adjacent to at least one of said first and second openings, wherein said raised edge forms a continuous raised rim around said opening.

23. The method as claimed in claim 22, wherein each of said plurality of through voids includes a substantially conical or cylindrical shaped inner surface.

24. The method as claimed in claim 22, wherein said first raised edge and/or said second raised edge is formed at a height level that is about 5-10 μm above said top surface.

25. The method as claimed in claim 22, wherein said through voids are formed in a media strip forming one or more layers of said support member.

26. The method as claimed in claim 25, wherein said media strip is a film, foil, or industrial strapping material.

27. The method as claimed in claim 26, wherein said film, foil, or strapping material comprises reinforcing fibers in MD, CD, or MD and CD, or in a random direction.

28. The method as claimed in claim 22, further comprising the step of:
  coating said top surface with a chemical to enhance sheet release, static dissipation, contamination/soil release, durability and/or structural integrity.

29. The method as claimed in claim 25, wherein the media strip is spirally wound to produce a desired length and width of the support member.

30. The method as claimed in claim 22, wherein the support member has an air permeability in the range of 100-500 cfm.

31. The method as claimed in claim 22, wherein said support member is an endless belt, made endless seamable belt or sleeve.

32. The method as claimed in claim 22, wherein the first opening and second opening have a diameter in the range of 0.01 mm to 5 mm.

33. The method as claimed in claim 22, further comprising the step of:
  forming a plurality of land areas and corresponding depressions.

34. The method as claimed in claim 33, wherein the plurality of through voids are formed on the plurality of land areas on the top surface of the support member.

35. The method as claimed in claim 33, wherein the plurality of through voids are formed in depressions on the top surface of the support member.

36. The method as claimed in claim 22, further comprising the step of:
  creating a plurality of grooves to create a topographical pattern for a patterning application.

37. The method as claimed in claim 36, wherein said grooves are continuous or discontinuous.

38. The method as claimed in claim 22, wherein said support member has a branched void structure, wherein said plurality of through voids on the top surface join to form a larger void on the bottom surface of said support member.

39. The method as claimed in claim 22, wherein said support member is a laminate with a woven or nonwoven layer laminated between a plurality of polymer films, foils, or strapping materials.

40. The method as claimed in claim 22, wherein said through voids are oval, round, substantially rectangular, or star shaped on said top surface and/or said bottom surface.

41. The method as claimed in claim 22, wherein said through voids are produced by laser drilling, mechanical punching, embossing, etching/graving or a combination thereof.

42. The method as claimed in claim 22, wherein said support member is a laminate with a plurality of monofilaments attached to the machine side of the support member.

43. A continuous nonwoven support member for use in a spunlace or hydronentanglement process, the support member comprising:
  a plurality of perforations, land areas, depressions, and/or grooves on a sheet contact side thereof to create a topographical pattern for a patterning application, wherein said support member is permeable to air, fluid and/or water, and wherein at least one raised edge is formed circumferentially adjacent to at least one of said plurality of perforations, wherein said raised edge forms a continuous raised rim around said opening.

44. The support member as claimed in claim 1, wherein said top surface and/or said bottom surface of said support member is patterned or textured.

45. The method as claimed in claim 22, wherein said top surface and/or said bottom surface of said support member is patterned or textured.

46. The support member as claimed in claim 43, wherein said top surface and/or said bottom surface of said support member is patterned or textured.

\* \* \* \* \*